US006454402B1

(12) United States Patent
Koitabashi et al.

(10) Patent No.: US 6,454,402 B1
(45) Date of Patent: Sep. 24, 2002

(54) INK-JET PRINTING METHOD AN INK-JET PRINTING APPARATUS

(75) Inventors: Noribumi Koitabashi, Yokohama; Hitoshi Tsuboi, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/468,839

(22) Filed: Dec. 22, 1999

(30) Foreign Application Priority Data

Dec. 24, 1998 (JP) .......................................... 10-368006

(51) Int. Cl.[7] ............................................... G01D 11/00
(52) U.S. Cl. .......................... 347/100; 347/101; 347/43
(58) Field of Search ........................... 347/100, 98, 96, 347/95, 43

(56) References Cited

U.S. PATENT DOCUMENTS 5,959,641 A * 9/1999 Yokoi .......................... 347/98
6,007,182 A 12/1999 Matsubara et al. ........... 347/43
6,074,052 A 6/2000 Inui et al. .................... 347/101

FOREIGN PATENT DOCUMENTS

EP 0897800 A2 * 2/1999 .............. B41J/2/01

* cited by examiner

*Primary Examiner*—John Barlow
*Assistant Examiner*—Manish S. Shah
(74) *Attorney, Agent, or Firm*—Fitzpatrick, Cella, Harper & Scinto

(57) ABSTRACT

Provided is an ink-jet printing method comprising the steps of penetrating a treating liquid which contains a component to react chemically with a pigment in an ink and has a penetrability onto a surface layer of a printing medium and the impacting ink-droplets containing the pigment to a portion among a whole surface of the printing medium where the treating liquid has been imparted, wherein a penetrating depth of the pigment applied to the treating liquid on the surface layer of the printing medium is deeper than a penetrating depth of the pigment alone applied to the printing medium on which no treating liquid is imparted and is shallower than a penetrating depth of the treating liquid.

36 Claims, 18 Drawing Sheets

INK-JET PRINTING METHOD AN INK-JET PRINTING APPARATUS

BACKGROUND OF THE INVENTION

1. Field of the Invention

The present invention relates to an ink-jet printing method and an ink-jet printing apparatus, and particularly to an ink-jet printing method and an ink-jet printing apparatus for printing by the use of treating liquid which insolubilizes a coloring material in an ink. An ink-jet printing method and an ink-jet printing apparatus according to the present invention are applicable to equipment for printing characters, images or the like on a recording medium such as paper, such as a printer, a copying machine and a facsimile machine, and are used in these items of equipment as a printing mechanism.

2. Related Background Art

Treating liquid for insolubilizing a coloring material such as a dye or a pigment in an ink is generally used to improve the water fastness of printed images or the like. The present applicant, however, has focused attention on the fact that the treating liquid significantly affects not only the improvement of such water fastness, but also printability such as density (for example, optical density (OD)) of printed images, sharpness of a printed image edge portion and fixing ability, and has made various proposals.

There has been made, for example, a proposal in which ink dots are formed with a goal of improved OD value by the use of ink using pigment as coloring material, and by use of a treating liquid and by mixing the ink and the treating liquid on a recording sheet.

The combination of ink using the pigment as coloring material and the treating liquid is also preferable to form dots having a so-called sharp boundary, which hardly causes any blurred contours to dots to be formed, in addition to the improved OD.

As described above, printing using the combination of the ink using a pigment as coloring material and the treating liquid is capable of implementing high OD and high sharpness in the image edge portion, thus enabling unprecedented, high-quality printing. The ink-jet printing system, however, leaves room for improvement in terms of the fixing ability to improve the printability.

In a case where, for example, a number of sheets of printing paper are continuously printed, a number of sheets of printing paper discharged after printing will be sequentially stacked. In this case, if fixing of the ink onto the printing paper, that is, the penetration of the ink into the printing paper is insufficient, the ink remains on the surface of the printing paper, the remaining Ink will be transferred onto another sheet of printing paper to contaminate the printing paper. If the ink fixing rate is slow in this manner irrespective of the capacity of the printing head and the printing paper conveying system, it is necessary to make the rate of the discharged sheet itself slower in order to prevent the printing paper from being contaminated thereby. Therefore, the fixing ability in the ink-jet printing-system becomes a comparatively great cause for restraining the number of sheets of printing paper to be outputted per unit time.

On the other hand, as an attempt to improve such fixing ability, there is known a method of using an ink having a high penetrability irrespective of whether or not the treating liquid is used. However, as the printing result using such ink, the OD is low, and the sharpness of the image to be printed is not so excellent.

There is also known a printing method, in which treating liquid having high penetrability and ink using dye as coloring material are used, the treating liquid is first imparted to the printing paper, and the ink is superposedly imparted thereon to thereby insolubilize the dye in the ink. Although, however, the fixing ability is improved by the use of the treating liquid having high penetrability, the OD is low and the sharpness of the image edge is also inferior. This tendency is particularly noticeable when so-called plain paper, which is mostly used for ink-jet printing, is printed.

Even if the treating liquid is used in combination with ink in order to print an image having a high OD and an excellent sharpness as described above, there is the problem that it is difficult to make the printability and the fixing ability compatible. Further, when this fixing ability, that is, penetrability is taken into consideration, there derives a problem of so-called strike-through property in which, in a case where the penetrability is simply enhanced, the coloring material penetrates deeply enough to be able to observe the printed image from the back side of the printed paper, and therefore, it is not an easy technical problem to make the OD or the like and the fixing ability compatible.

The present invention is achieved to solve such technical problems, and is aimed to provide an ink-jet printing method and an ink-jet printing apparatus capable of performing printing having unprecedented, high-level fixing ability while maintaining the OD and sharpness in the image edge portion at high levels, and further capable of effectively restraining the strike-through problem.

It is particularly an object of the present invention to provide an ink-jet printing method and an ink-jet printing apparatus capable of always showing the fixing ability of a fixed level or higher on various types of plain paper. In this respect, the "plain paper" here means printing paper generally for use In printers, electrophotographic systems or the like.

Also, other objects of the present invention become apparent also from the following description in the specification.

SUMMARY OF THE INVENTION

Therefore, according to the present invention, there is provided an ink-jet printing method comprising the steps of penetrating a treating liquid which contains a component to react chemically with a pigment in an ink and has a penetrability onto a surface layer of a printing medium, and impacting ink-droplets containing the pigment to a portion, among a whole surface of the printing medium, where the treating liquid has been imparted, wherein a penetrating depth of the. pigment applied to the treating liquid on the surface layer of the printing medium is deeper than a penetrating depth of the pigment alone applied to the printing medium on which no treating liquid is imparted and is shallower than a penetrating depth of the treating liquid.

Also, there is provided an ink-jet printing method comprising the steps of forming an ink-receiving part on a surface layer of a printing medium and conducting printing by depositing an ink so as to contact with the ink-receiving part, wherein the ink-receiving part is formed by depositing to a surface of the printing medium a treating liquid comprising a penetrating agent and an insolubilizer to a coloring material in the ink, the ink comprises a predetermined amount of a pigment as the coloring material, an average liquid thickness per pixel of the treating liquid forming the ink-receiving part at the impact on the printing medium is not more than 10 $\mu$m, a volume of the treating liquid to a volume of the ink per pixel is not less than ⅛, and an average liquid thickness of the ink per pixel at the impact on the printing medium is from 8 $\mu$m to 20 $\mu$m.

Further, there is provided an ink-jet printing apparatus to conduct printing by forming an ink-receiving part on a surface layer of a printing medium and then depositing an ink so as to contact with the ink-receiving part, wherein the ink-receiving part is formed by depositing to a surface of the printing medium a treating liquid comprising a penetrating agent and an insolubilizer to a coloring material in the ink, the ink comprises a predetermined amount of a pigment as the coloring material, an average liquid thickness per pixel of the treating liquid forming the ink-receiving part at the impact on the printing medium is not more than 10 $\mu$m, a volume of the treating liquid to a volume of the ink per pixel is not less than ⅛, and an average liquid thickness of the ink per pixel at the impact on the printing medium is from 8 $\mu$m to 20 $\mu$m Also, according to the present invention, there is provided an ink-jet printing method comprising the steps of applying an ink comprising a pigment in a dispersed state to at least a part of a predetermined region of a printing medium, to which a liquid, which contains a component having a reactivity to the pigment contained in the ink and shows a higher level of penetrability than that of the ink to the printing medium, has been imparted and forming a pigmented portion on the printing medium, wherein a penetrating depth of the pigment applied to the printing medium at the pigmented portion is deeper than a penetrating depth of the pigment at the pigmented portion obtained in a case that only the ink is applied to the printing medium and is shallower than at a tip of penetration of the treating liquid.

Also, according to the present invention, there is provided a printed article having a pigmented portion formed by contacting an ink comprising a pigment in a dispersed state with a liquid, which contains a component having a reactivity to the pigment contained in the ink and shows a higher level of penetrability than that of the ink to the printing medium, and which has been imparted, to the recording medium wherein a penetrating depth of the pigment applied to the printing medium at the pigmented portion is deeper than a penetrating depth of the pigment at the pigmented portion obtained in a case that only the ink is applied to the printing medium and is shallower than at a tip of penetration of the treating liquid.

With this configuration, the ink-receiving part is formed on the surface layer of the printing paper by the treating liquid. More specifically, the treating liquid deposited to the printing medium makes a compatibility-imparting treatment to the surface layer of the paper. That is, this formation promotes penetration of the ink, which next comes into contact with this portion for depositing, into the printing medium.

Also, the treating liquid contains a component (ink insolubilizer), which chemically reacts with a pigment contained in the ink, and is adsorbed on the surface of fiber and/or between the fibers of the printing medium in an ink-receiving part. Thus, the coloring material in the ink is adsorbed. This coloring material contains a predetermined amount or more of pigment, and the pigment particles are adsorbed in the surface layer portion of the paper containing the ink-receiving part.

As a result, the depth of penetration, into the printing medium of the pigment in the pigmented portion to be formed on the paper surface layer portion becomes deeper than that of the pigment in the pigmented portion to be formed when only the ink is imparted to the printing medium, and therefore, the fixing ability is to be improved. On the other hand, since the mobility of the pigment is degraded because of a reaction of the reaction component in the treating liquid with the pigment, the depth of penetration of the pigment can be made shallower than at the tip end of penetration, in the printing medium, of solvent for the treating liquid. As a result, it becomes possible to retain the pigment in the surface layer portion of the printing medium, and a pigmented portion having sufficient optical density can be obtained while the fixing ability of the pigment ink is being improved.

The treating liquid for forming the ink-receiving part impacts on paper as a liquid droplet, and the thickness of the liquid droplet at the impact on the paper is preferably set to 5 to 10 $\mu$m. This is because, since the void rate of the printed paper is about 50%, the treating liquid having penetrability instantaneously penetrates to at least a depth of from 10 $\mu$m to 20 $\mu$m. This thickness affects the fixing ability, OD, the strike-through property or the like of a subsequent ink to be deposited.

That is, since there is a correlation between the thickness of the ink-receiving part and the ink-receiving tolerance, the ink for that amount instantaneously penetrates into the ink-receiving part in the printed paper.

Also, although this ink-receiving part is not always necessary to be uniform on the surface of the printing medium, but may be mottled, it is at least necessary to bring the ink-receiving part into contact with ink droplets corresponding to the pixels on the surface of the paper. More specifically, the ink droplets come into contact with the ink-receiving part, whereby penetration of the ink, reaction of coloring material containing pigment, and diffusion of ink droplets on the surface of the printing medium become possible.

In the course of the process in which the ink penetrates into the ink-receiving part, the pigment in the coloring material is trapped by fiber on which ink insolubilizer has deposited, and when ink of receiving tolerance or more is deposited, the penetration rate lowers, and therefore, the fixing ability is degraded. On the other hand, when the thickness of the ink-receiving part is too large, fine particles in the coloring material in the ink penetrate more deeply, and therefore, the strike-through property is degraded although the fixing ability is improved.

As regards OD, it is known that it can be determined by reflected light up to about 20 $\mu$m from the surface of the printing medium, and for this reason, in order to improve the OD, the coloring material in the ink can be densely trapped up to about 20 $\mu$m of the surface layer of the printed paper, and an ink-receiving part enough to penetrate the ink for that amount at high rate is formed.

Since the wettability of the ink-receiving part has become high, when the ink comes into contact with the portion and is deposited, the ink instantaneously spreads in the horizontal direction and then high area factor can be secured by a small amount of ink. As a result, strike-through is also reduced.

Also, since the coloring material containing pigment particles is trapped by the insolubilizer in the paper while the ink droplets deposited instantaneously spread on the surface of the printed paper, blurring of the ink such as so-called feathering is greatly reduced, resulting in sharp image edges.

A described above, high fixing ability, high OD, sharp edges and excellent strike-through property can be implemented.

DESCRIPTION OF THE PREFERRED EMBODIMENTS

Figure 1:
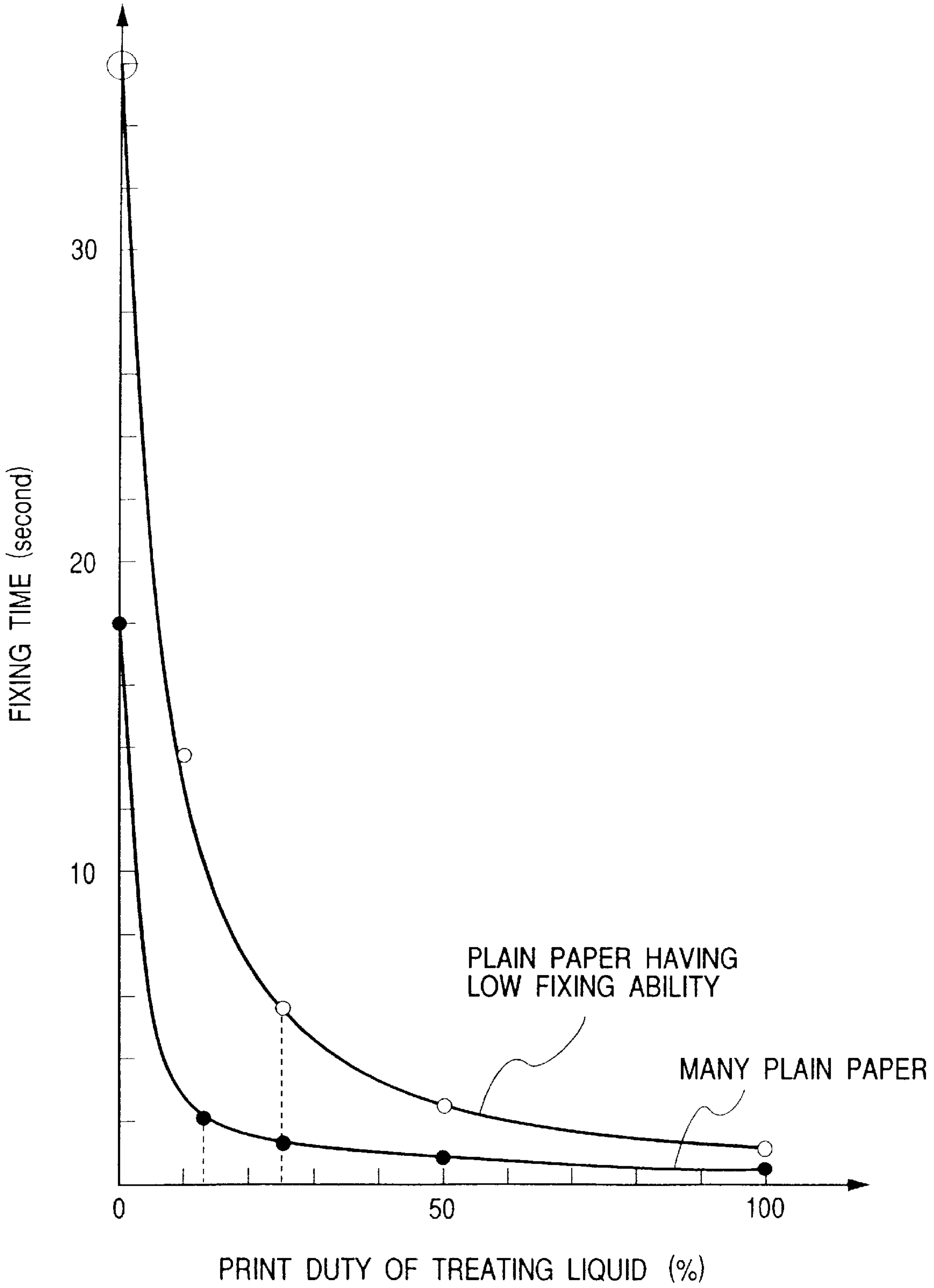
FIG. 1 is a chart showing the relationship between printing duty of treating liquid and fixing time in a printing experiment according to an embodiment of the present invention.

An ink-jet printing method and an ink-jet printing apparatus according to an embodiment of the present invention are based on the following printing experiment and examination of the result thereof.

More specifically, a recording head with ink ejection orifices disposed at a density of 600 dpi is used for black (Bk) ink and the treating liquid, respectively. An interval between these heads is set within a range of ½ inch to 2 inches, the treating liquid is first ejected, and thereafter, the Bk (black) ink is ejected, and the driving frequency for each head at this time is varied, whereby. as a result, the treating liquid is impacted on the printing paper (hereinafter, also referred to as "paper") and duration until the Bk ink impacts thereafter is varied within a range of 0.05 second to 0.8 second.

The treating liquid used for the experiment is obtained by combining ethylene oxide adduct of 2,4,7,9-tetramethyl-5-decyne-4,7-diol (hereinafter, referred to as "Acetylenol"; trade name, product of Kawaken Fine Chemicals Co., Ltd.) as a penetrating agent, acetate of polyallylamine (hereinafter, referred to as "PAA"), which is a cationic polymeric component, and benzalkonium chloride, which is a cationic surface active agent, with each of the respective percentage contents of (0% by weight, 0.7% by weight, 2.0% by weight), (0% by weight, 2% by weight, 4% by weight) and (0% by weight, 0.5% by weight, 4% by weight).

On the other hand, the ink is a black ink comprising carbon black, which is a pigment obtained by dispersing with dispersant (for example, styrene-acrylic copolymer) as coloring material, and anionic dye (for example, Food Black 2), or is a Bk ink using a mixture of carbon black, which is a self-dispersing type pigment, and the anionic dye. In the printing experiment, a ratio (a proportion of pigment in the entire coloring material consisting of pigment and dye, hereinafter referred to also as "pigment/dye ratio") of pigment to dye is varied for the respective ink while the amount of these coloring materials in the whole is set to an amount within a range of 3% by weight to 5% by weight of the ink amount. Also, the penetrability of the ink is set comparatively low with the amount of acetylenol as 0% by weight to 0.3% by weight of the entire ink amount.

The experiment was performed at an ejection amount of the treating liquid within the range of from 12 pl to 30 pl and at an ejection amount of an ink within the range of from 15 pl to 40 pl. The printing duty at this time was set such that one drop was ejected to one pixel having a density of 600 dpi for both the treating liquid and the ink as a general rule. As regards the treating liquid, however, a case of thinning was also included. More specifically, as described above, in addition to one drop (printing duty 1, in a similar way hereinafter) to one pixel, thinning is performed, and experiments were performed for five types of printing duty: one drop for two pixels (½), one drop for four pixels (¼), one drop for eight pixels (⅛) and non-printing (0).

As various conditions described above or a combination of parameters, the following first Experimental Example 1 and other Experimental Examples were performed, and from those experimental results, as shown in Table 1, a more preferable range of printing parameters could be obtained concerning the fixing ability, OD value, sharpness and strike-through, which are evaluation items concerning the printability.

TABLE 1

| | Fixing Property | OD | Sharpness | Strike-through |
|---|---|---|---|---|
| Ejection Amount of Bk Ink: Vd | 33 pl or less (preferably 20 pl or less) | 15 pl or more | 30 pl or less (preferably 25 pl or less) | 40 pl or less (preferably 30 pl or less) |
| Printing duty of Liquid Treatment | 25% or more (preferably 50% or more) | 25% or more (preferably 50% or more) | 25% or more (preferably 50% or more) | When Vd of Bk ink is 18 pl to 36 pl, it is 50% or less. When Vd of Bk ink is less than 18 pl, it is 100% or less. |
| Pigment Ratio | | 30% or more | 30%–100% (preferably 50%–90%) | 10%–100% (preferably 30%–70%) |

Experimental Example 1 and other Experimental Examples will be described in the following.

EXPERIMENTAL EXAMPLE 1

In this experiment, the ink using self-dispersing type carbon black as a pigment and Food Black 2 as an anionic dye was employed. The total content of the coloring materials (the pigment and the dye) was about 4 to 5% by weight of the entire ink. And a treatment liquid contained about 4% by weight of PAA and 0.5% by weight of EBK.

Fixing Ability

Fixing ability, one of the evaluation items of the printability required for ink, was evaluated with respect to the ink of this experimental example. And a high fixing ability was observed in almost all types of plain paper as long as the concentration of Acetylenol, as a surfactant, was equal to or more than the critical micelle concentration (hereinafter referred to as "CMC") of water (in this embodiment 0.7% or more).

The fixing time herein refers to the time measured until the reflected light from drops of the liquid ink on the surface of the paper printed out and delivered, what is called "glisten", cannot be visually observed. It was verified by measuring the time intervals which allowed the ink on the delivered paper to cause no ink spots on the back side of the paper subsequently delivered when conducting a continuous printing on multiple sheets of paper and a continuous ejection amount of the same.

The printing conditions in such a case were such that the ejection amount of the treating liquid was 15 pl and the printing duty was 25% or more. When the ejection amount of the treating liquid is set for, for example, 30 pl, however, the ink exhibits a high fixing ability even if the printing duty is less than the above value, 25%, provided that it is more than 20%. This is because in a printed image, although the ink-receiving layer formed by the treating liquid should be about 50% or more on an area factor (hereinafter referred to simply as "AF") basis, and the above AF range can be satisfied by increasing the ejection amount of the treating liquid even if the printing duty is relatively low, as described below.

FIG. 1 is a diagrammatic view showing the relationship between printing duty of a treating liquid and ink fixing time when the ejection amount of a Bk ink is 30 pl and that of the treating liquid containing 2% by weight of Acetylenol is 15 pl.

As shown in FIG. 1, when the printing duty of the treating liquid is 25% or more, the fixing time is less than 2 seconds for almost all the plain paper. And even for the plain paper with a low fixing ability, the ink on the paper surface is absorbed into the paper in 6 seconds or less. This allows a relatively high-speed printing of 10 prints per minute (10 ppm). Although FIG. 1 shows the relationship when the Acetylenol content is 2% by weight, it has been confirmed by the present inventors' experiments that almost the same quantitative relationship as shown in FIG. 1 is observed when the Acetylenol content is 0.7% by weight or more.

Then, an experiment was carried out with ink using dye alone as a coloring material so as to investigate the effects of the coloring material on the fixing ability of the ink. Specifically, first a treating liquid with a high penetrability whose Acetylenol content was 0.7% by weight or more was ejected to plain paper, then the above dye ink was ejected in such a manner that it came in contact with the treating liquid having been ejected on the paper. In this case, although a high fixing ability was obtained, OD value was low, bleeding occurred at the edge portions of characters and images, and images of high quality could not be obtained.

Thus, it was found that the ink must contain pigment as a coloring material in order to perform printing of high-speed fixing ability which enables the production of a high quality level of characters and images.

Figure 2:
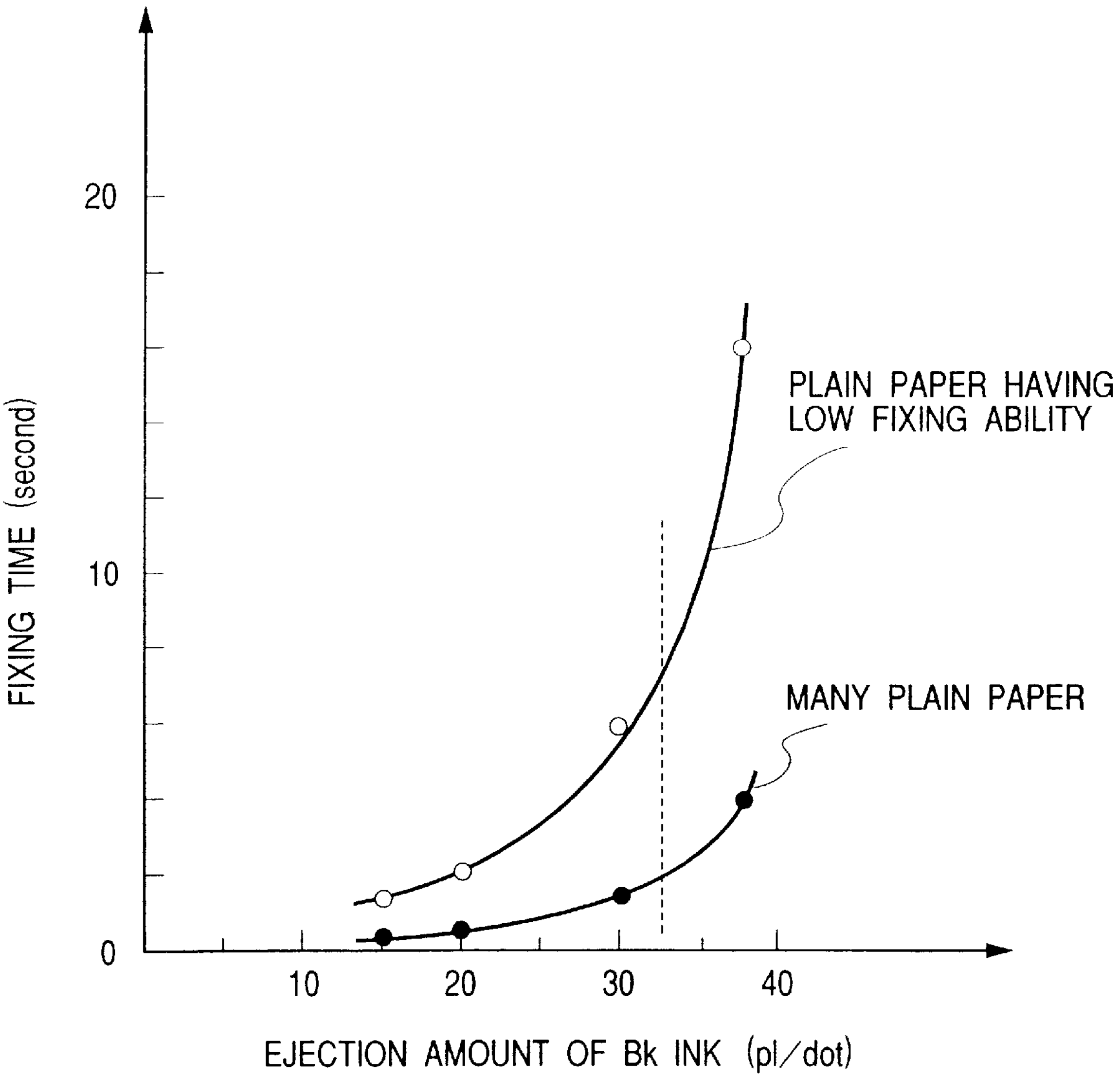
FIG. 2 is a chart showing the relationship between an ejection amount of a Bk-ink and fixing time in a printing experiment according to an embodiment of the present invention.

Another experiment was carried out on the ink to investigate the effects of its ejection amount on the fixing ability. The experimental results are shown in FIG. 2 which is a diagrammatic view showing the relationship between the ejection amount of Bk ink and the fixing time of the same. In the experimental conditions shown in the drawing, the printing duty of the treating liquid is 25% which is the minimum value to satisfy the fixing ability in terms of the relationship shown in FIG. 1.

As shown in FIG. 2, when the ejection amount of the Bk ink is 30 pl or less, the fixing time is within about 10 seconds even with the plain paper that has inferior fixing ability, and it is within about 3 seconds in other plain paper. And it has been verified by the experiments that the above relationship is almost completely maintained when the Acetylenol content is equal to or more than CMC of water, that is, 0.7% by weight or more. These results for the fixing ability are attributed to the treating liquid delivered prior to the Bk ink which serves to increase the wettability of the paper to the ink subsequently delivered.

On the other hand, when increasing the ejection amount of the Bk to more than 30 pl, the fixing ability tends to decrease rapidly after the ejection amount of the Bk ink becomes 36 pl. moreover, there appear blurred portions in the outline of the ink dots thus formed. It seems as if the ink has been swept up downstream in the direction of the print head's scanning. According to the present inventors' examination, the reasons for the above phenomena are as follows. First, the ink fixing speed was dropped by feeding ink in excess of the permissible level of the ink-receiving layer, which is described below, formed by the treating liquid, in other words, feeding ink in excess of the permissible level of ink-receiving capacity. Second, an overflow of the ink was swept up downstream in the direction of the head scanning, which made the outline of ink dots unclear.

Considering the critical value of ejection amount of the Bk ink not in terms of dots, but macroscopically in terms of, for example, the entire printed image, the volume ratio of a treating liquid to an ink is about 1:8 at this critical value. Specifically, in view of the AF (area factor) value being about 50% when the printing duty of the treating liquid is 25%, a fair amount of ink is considered to flow into the printing area of the treating liquid, some ink penetrates into the non-printing area of the treating liquid, though; thus, the amount of the treating liquid may be about one eighth as much as that of the ink.

In Experimental Example 1 of the present embodiment, a Bk ink using both a pigment containing no dispersant and a dye jointly as coloring materials was employed. Although the ratio of the pigment to the dye slightly affects the ink fixing time as described below, it has been verified that the effect is not so serious as to cause a problem of fixing ability in actual printing.

In this Experimental Example, the Acetylenol content of the treating liquid was set for at least 0.7% by weight. If the above content is set for, for example, about 0.5% by weight and an ink-receiving layer is created with this treating liquid, compatibility of ink with the paper surface will be satisfactory, but ink fixing time will become longer due to the decrease in penetrability of the ink into paper.

OD

In the following, the Experimental Example 1 will be described in terms of optical reflection density (hereinafter referred to as "OD") which is one of the evaluation items of printability. In this experiment, OD was measured with a Macbeth transmission reflection densitometer. And the Acetylenol content of the treating liquid used was set for 0.7% by weight or more as described in the above "Fixing Ability", concretely 2% by weight, since the present embodiment aimed particularly at high-speed fixing.

Figure 3:
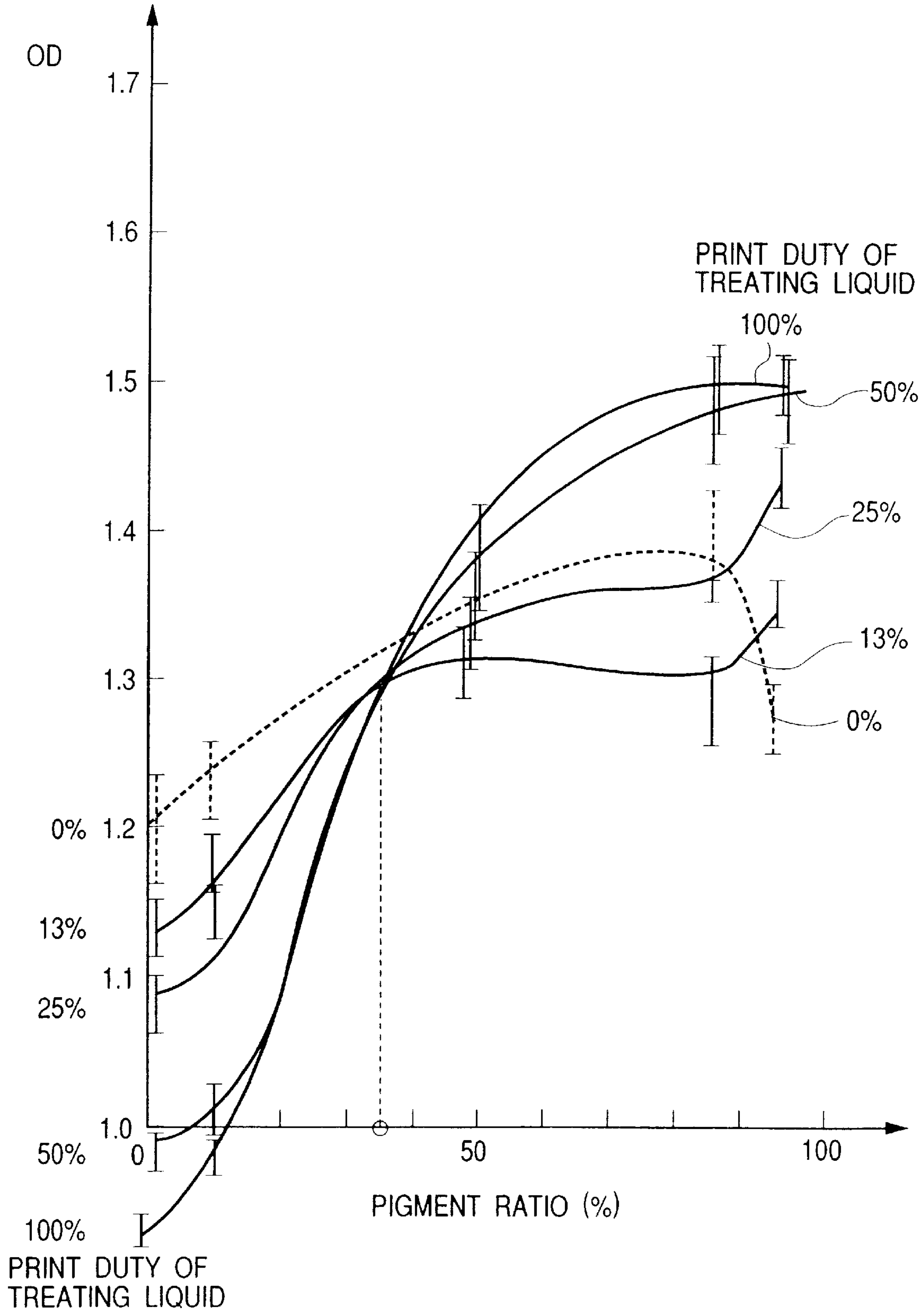
FIG. 3 is a chart showing the relationship between pigment ratio and OD in a printing experiment according to an embodiment of the present invention with printing duty of treating liquid as a parameter.
Figure 4:
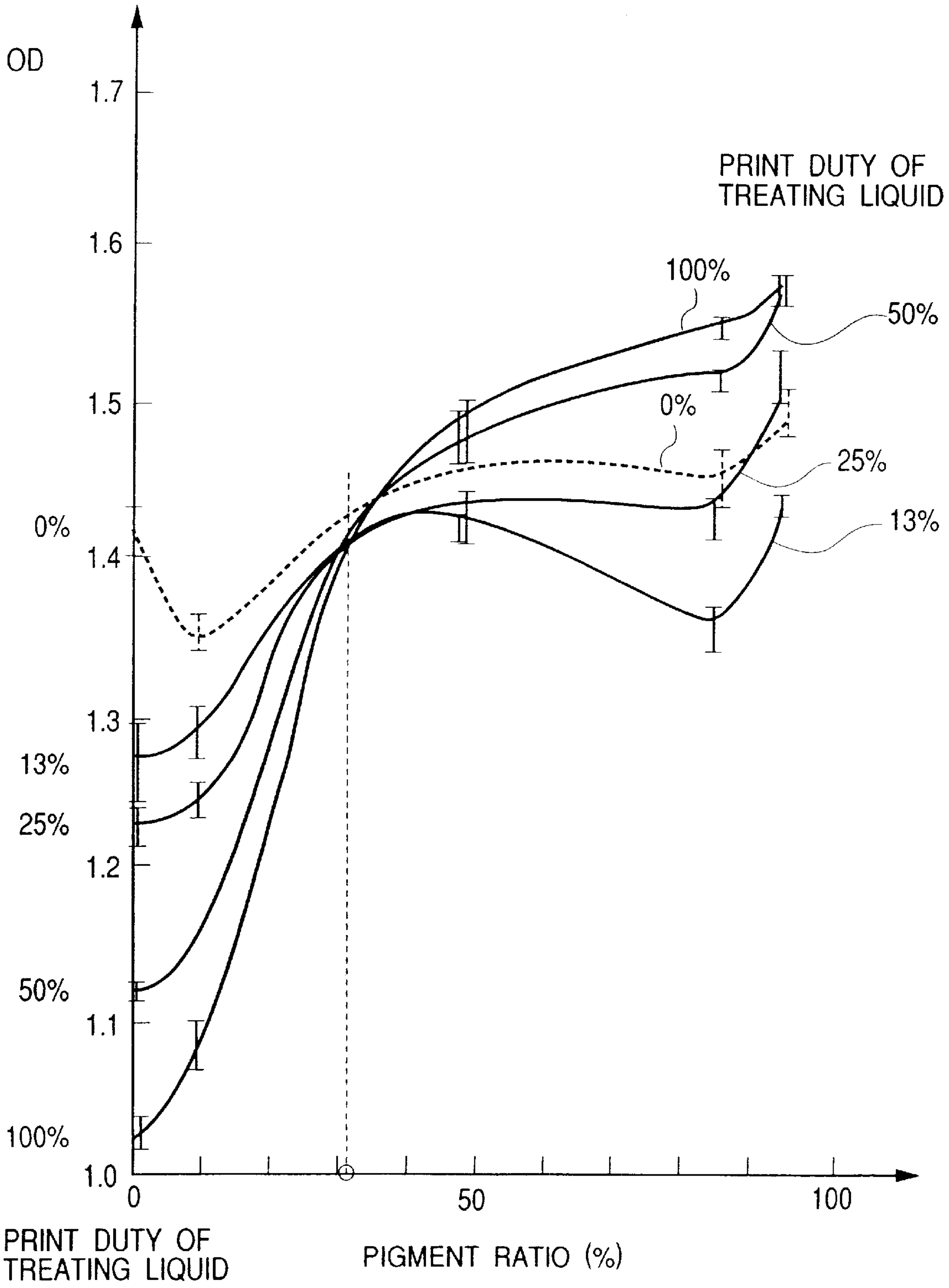
FIG. 4 is a chart showing the relationship between pigment ratio and OD in a printing experiment according to an embodiment of the present invention with printing duty of treating liquid as a parameter.
Figure 5:
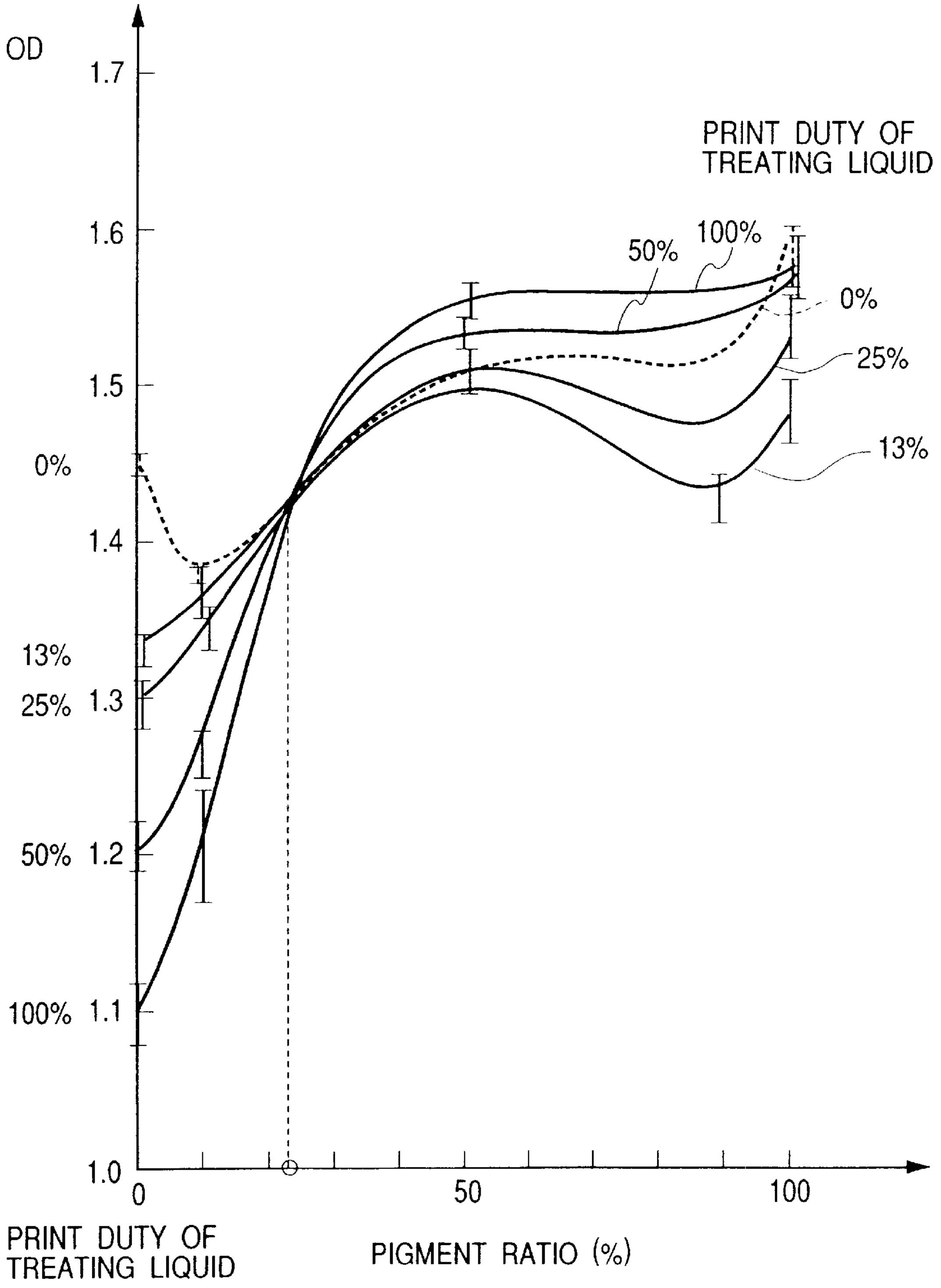
FIG. 5 is a chart showing the relationship between pigment ratio and OD in a printing experiment according to an embodiment of the present invention with printing duty of treating liquid as a parameter.
Figure 6:
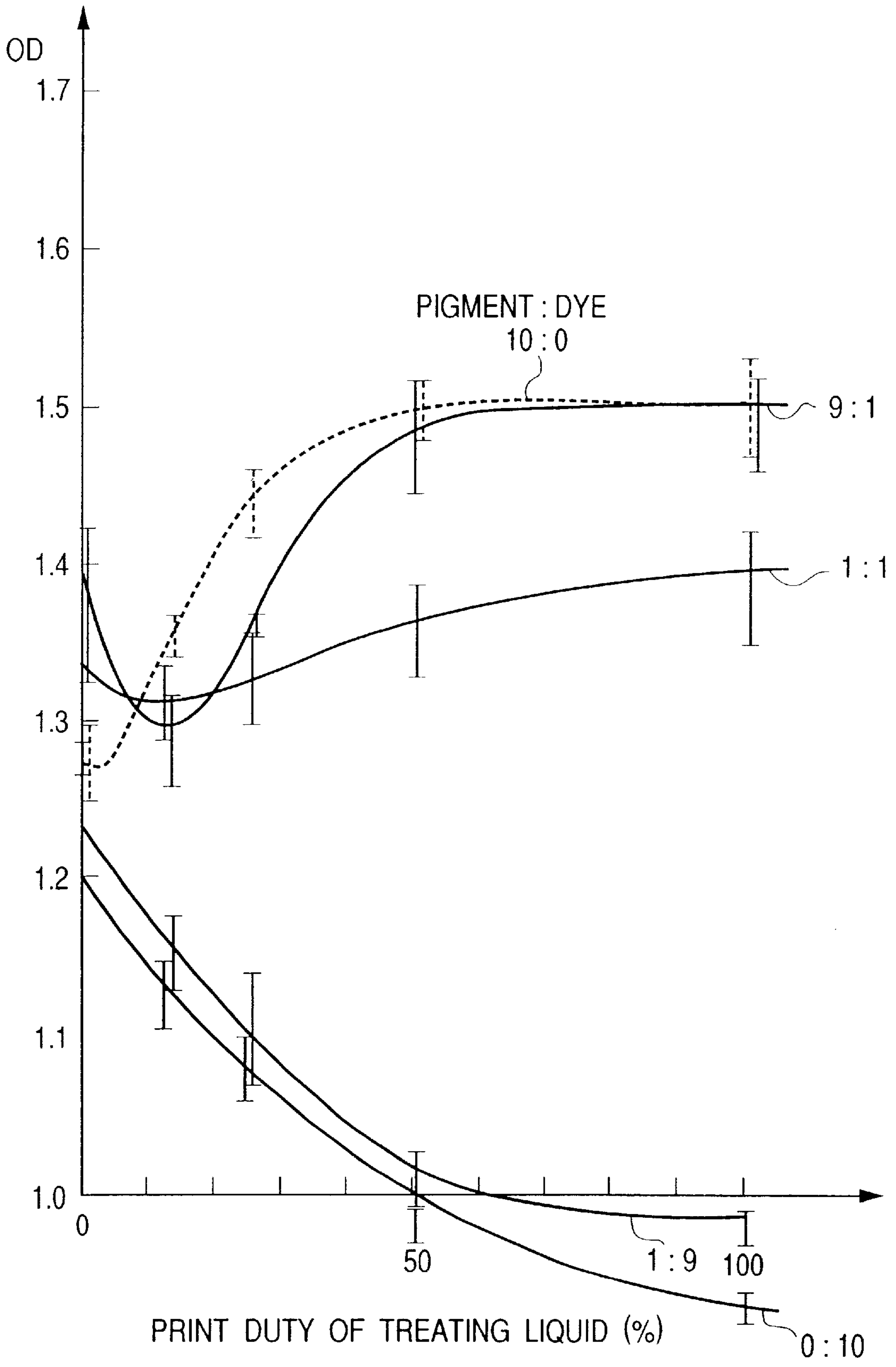
FIG. 6 is a chart showing the relationship between printing duty of treating liquid and OD in a printing experiment according to an embodiment of the present invention with pigment ratio as a parameter.
Figure 7:
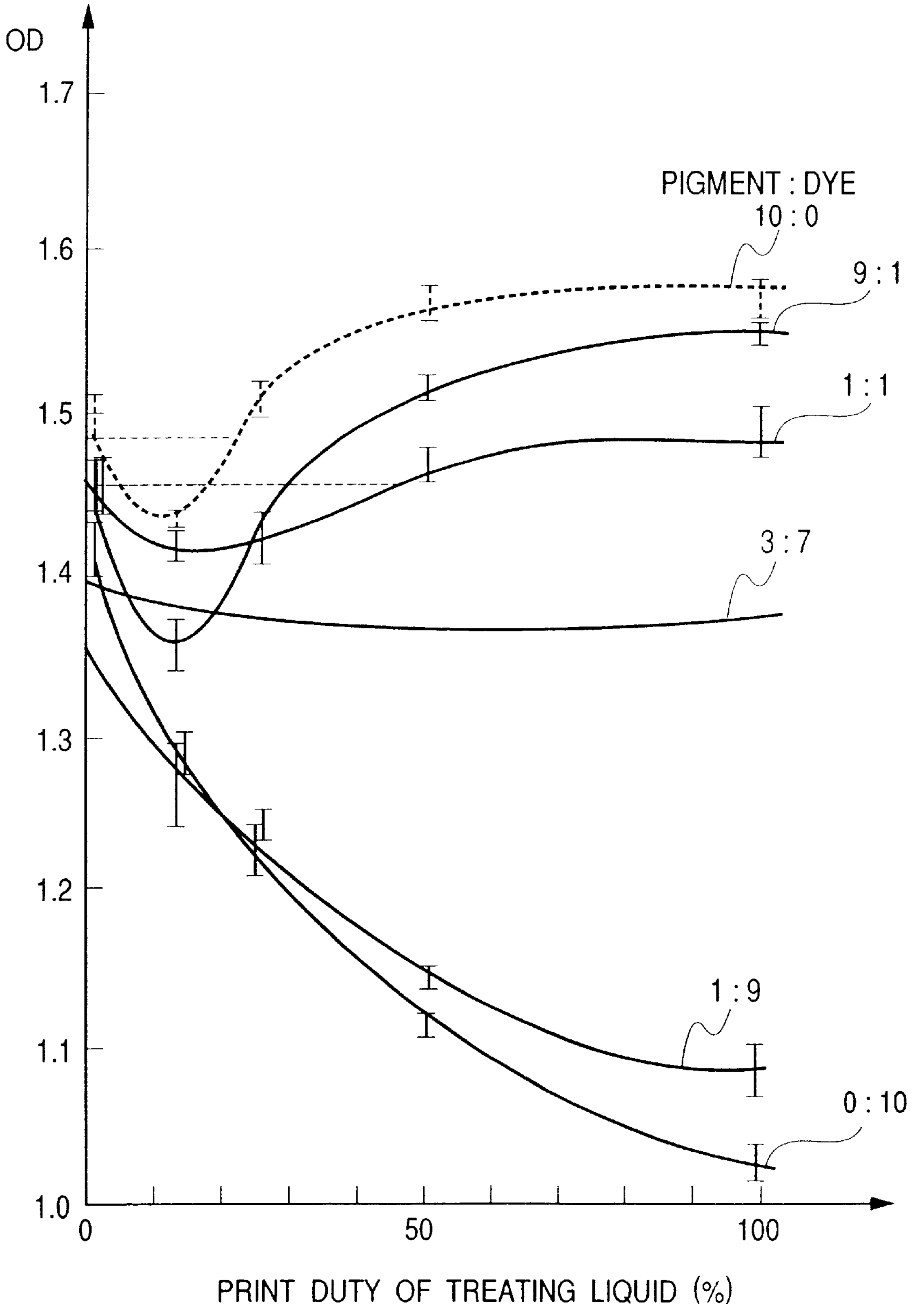
FIG. 7 is a chart showing the relationship between printing duty of treating liquid and OD in a printing experiment according to an embodiment of the present invention with pigment ratio as a parameter.
Figure 8:
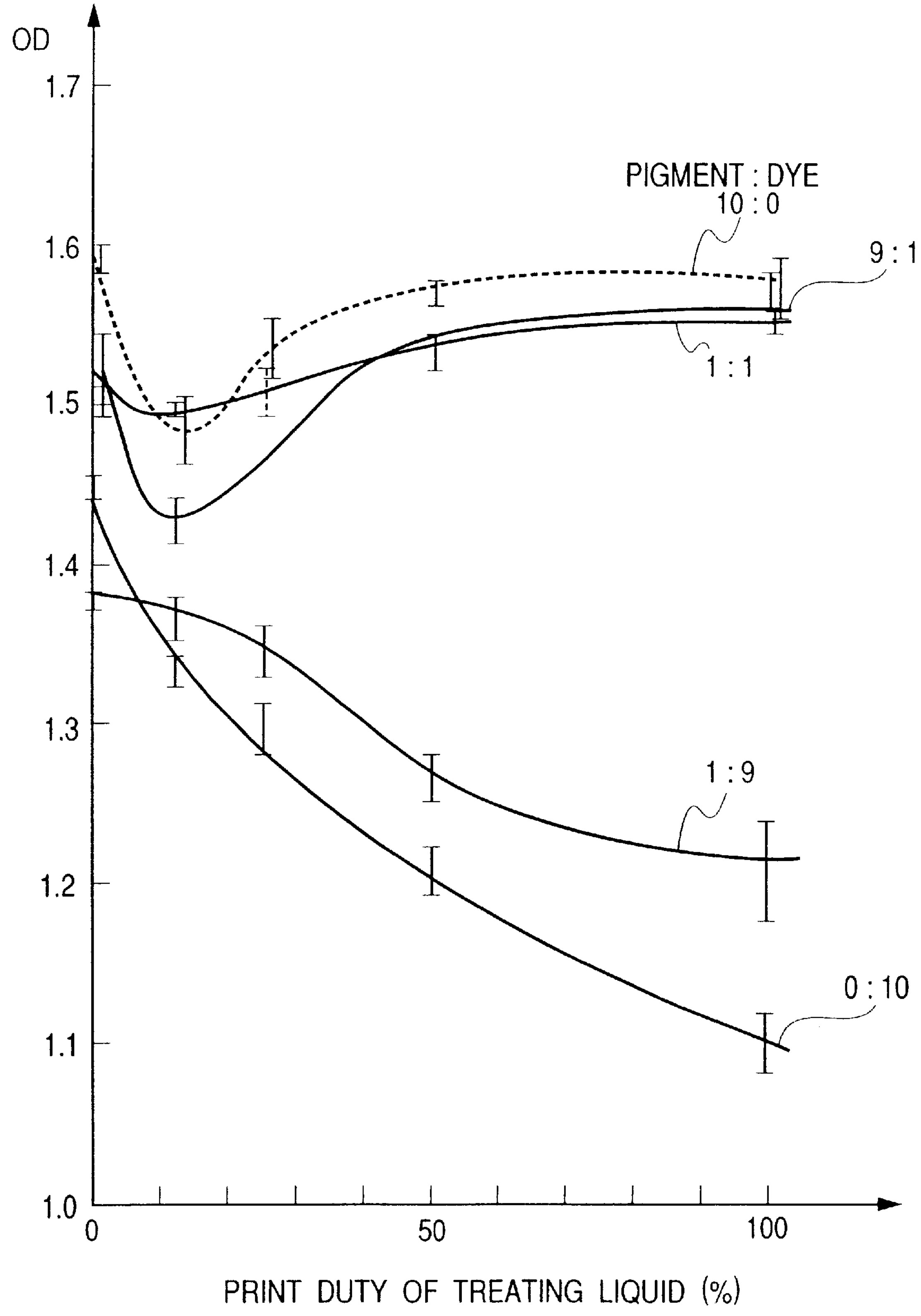
FIG. 8 is a chart showing the relationship between printing duty of treating liquid and OD in a printing experiment according to an embodiment of the present invention with pigment ratio as a parameter.

In this experiment, printing was carried out in the variables and parameters shown in FIGS. 3 to 5 and FIGS. 6 to 8. FIGS. 3 to 5 are views showing the relationship between the weight ratio of pigment (carbon black) to the coloring materials of the Bk ink (pigment without dispersant and dye) used in this Experimental Example (hereinafter referred to as "pigment ratio" for simplicity) and OD in cases where the deliveries of the Bk ink are 18 pl, 30 pl and 36 pl, respectively, using the printing duty of the treating liquid as a parameter. And FIGS. 6 to 8 are views showing the relationship between the printing duty of the treating liquid and OD in the parameter of the pigment ratio for the deliveries of the Bk ink being 18 pl, 30 pl and 36 pl, respectively.

As is obvious, for example, in the case where the ejection amount of the Bk ink is 30 pl, as shown in FIG. 7 of these drawings, when the pigment ratio is 30% by weight (3:7), OD is almost constant regardless of the printing duty of the treating liquid. This means, in the relationship shown in FIG. 4, that the curves representing the relationship between the pigment ratio and OD in each printing duty of the. treating liquid intersect in the point where the pigment ratio is about 30% by weight. The pigment ratio at which OD is constant regardless of the printing duty of the treating liquid varies a little depending on the ejection amount of the Bk ink. When the ejection amount is 18 pl, the pigment ratio is 30 to 35%, and when the ejection amount is 36 pl, the pigment ratio is about 25%, as shown in FIGS. 3 and 5, respectively.

As seen from the relationships shown in, for example, FIGS. 4 and 7, when the pigment ratio is less than 30%, which is related to the above intersection, the higher the printing duty of the treating liquid becomes, the lower OD becomes. The reason for this is considered to be as follows. Since the penetrability of the treating liquid was set for a higher value in this embodiment, PAA, a polymeric component of the treating liquid, and the pigment accounting for the most part of the coloring materials (70% by weight or more) were hard to react and intertwine with each other. As a result, the higher molecules of the dye and the pigment were hard to form, and they penetrated the paper in the direction perpendicular to its surface. Thus a high fixing ability can be obtained due to the treating liquid. OD, however, becomes low when the pigment ratio is relatively low, in particular, 30% or less. Further, the mixture of the treating liquid and the ink was liable to penetrate the paper even in the direction parallel to its surface, which led to the occurrence of fine feathering.

The above phenomenon that the polymeric component of the treating liquid was hard to intertwine with the pigment is further attributed to the following two presumptions. Specifically, one presumption is that, in a state where the treating liquid does not remain on the paper surface due to its high-speed penetration, only a small amount of PAA, a polymeric component, remains on the paper fiber. Accordingly, only a small amount of dye remains on PPA deposited on paper fibers and most dye further penetrates the paper in the direction perpendicular to its surface. The other one is that, even if treating liquid remains on the paper like a puddle, the dye has penetrated into the paper in the direction perpendicular to its surface before it forms a higher molecule by reacting with the treating liquid, since the reaction proceeds relatively slowly.

As seen from FIGS. 4 and 7, when the pigment ratio is about 30% or more (where the ejection amount of the Bk ink is 30 pl) and the printing duty of the treating liquid is about 25% or more, OD becomes larger as the printing duty increases. This may be because the increased ratio of the pigment, as a coloring material, allows the reaction product of the pigment and the treating liquid to deposit to the paper fiber and a relatively large amount of the treating liquid remains on or in the vicinity of the paper surface.

When the pigment ratio is 90% or more and the printing duty of the treating liquid is as low as about 13%, OD is extremely low (where the ejection amount of the Bk ink is 30 pl), as shown in FIG. 7. The reason for this may be as follows.

The penetrability of ink is relatively high at the portions where the treating liquid is printed prior to the ink-ejection amount to the same (the portions where the ejected treatment liquid spreads on papers), on the other hand, it is low at the portions where the treating liquid is not printed. In such a situation, the ink at the portions without the treating liquid printed on them flows into the portions with the treating liquid printed on them (hereinafter referred to as "holes" for convenience). As a result, localization of OD occurs in which OD becomes low at the portions without the treating liquid printed on them while it is high at the holes. If the printing duty of the treating liquid is 13% (about ⅛) in such a condition that the above localization occurs, it can be said from the viewpoint of area factor, the portions substantially having no treating liquid, in other words, the portions having no treating liquid printed on them (the portions of low OD) account for half or more of the entire printed image. This may be observed as an extreme decrease in OD as a whole.

On the other hand, when the pigment ratio ranges from 30% to 70%, the decrease in OD was not very extreme even if the printing duty of the treating liquid was as low as about 13%. This may be considered as follows in terms of the concept of "holes" described above. When the pigment ratio is about 30% to 70%, the reaction product of the dye and PAA acts on the pigment particles as a kind of adhesive, so that the pigment particles become larger and easier to deposit to the paper fiber. Accordingly, the penetration speed of the coloring materials is slightly lowered, but the penetration and swelling of the ink at the portions other than the holes proceed so much more, which leads to preventing the decrease in OD as a whole.

With respect to the ink fixing time, it has been confirmed by this experiment that the ink fixing time becomes longer by about 30%, when the pigment ratio is, for example, 50% as compared with when the pigment ratio is other than 30% to 70%. This also means that the penetration speed is decreased. When the pigment ratio is about 30% to 70%, OD of the printed image measured from the back side of the printed paper is also decreased (in this case, it is preferable that OD is low and this state is also referred to as "good in strike-through"). In addition, the images with edges good in sharpness can be obtained. This may be evident from the fact that the viscosity of the mixed solution of the treating liquid and the ink is high when the pigment ratio is 30% to 70% as compared with when the pigment ratio is other than the above range.

As described above, when the pigment ratio is 30% or more (this value varies depending on the ink-ejection amount), OD basically becomes higher with the increase in the printing duty of the treating liquid. This may be because OD at the portions with the treating liquid printed on them becomes high when the pigment ratio is equal to or more than the above value, accordingly, OD as a whole becomes higher with the increase in the printing duty, as described above.

In such conditions, when the printing duty of the treating liquid is 50% or more, OD is almost saturated in the examples shown in FIGS. 6 to 8. This means that OD shows a satisfactory value, which satisfies the value when the printing duty is 100% fairly well, as long as the ejection amount of the Bk ink is 15 pl or more, even if AF of the treating liquid does not satisfy the value of 100% when the printing duty is, for example, 50%. the reason that OD is fully expressed as described above may be that the ink spreads on the paper following the portions having got wet with the treating liquid and its coloring materials, mostly pigment, fix on the layer not away from the paper surface.

In cases where the pigment ratio is about 30% or more, the ejection amount of the Bk ink is 30 pl or less, and the printing duty of the treating liquid is about 25% or more, OD of the printed image is high as compared with that of the image where no treating liquid is printed (in the drawings, shown with broken lines), as shown in FIGS. 3 and 4.

As for the effects of the ejection amount of the Bk ink on OD, the larger the ejection amount becomes, the higher OD becomes. When the pigment ratio is 90% or more, however, OD does not vary very much depending on the ejection amount of the Bk ink in the preferable range of the printing duty of the treating liquid described above, as shown in FIGS. 3 to 5. In other words, when the ejection amount of the Bk ink is 15 pl or more, a high OD can be materialized.

Sharpness

In Experimental Example 1 of the present invention, sharpness was observed visually via a microscope for the edges of the characters and what is called solid print printed as described above. According to this printing experiment, when the pigment ratio was 30% to 100%, preferably 50% to 90%, the ejection amount of the Bk ink 30 pl or less, preferably 25 pl or less and the printing duty of the treating liquid 25% or more, preferably 50% or more, a satisfactory sharpness was obtained.

In cases where the ejection amount of the Bk ink is less than 25 pl, deterioration of sharpness is small even if the pigment ratio is high. In cases where the ejection amount of the Bk ink is 25 pl or more, however, there occur a little unclear, hazy boundary portions In the vicinity of the edges of the printed images. This may be attributed to the increase in the outflow of the small-diameter pigment particles with the increase in the pigment ratio. In this case, the dye intermingled with the pigment, as a coloring material, is preferable because it serves to prevent the outflow of the pigment particles with its adhesive effect due to the reaction with PAA of the treating liquid.

When the ejection amount of the Bk ink is 30 pl or more, the amount of the overflow which has not been absorbed into paper becomes relatively large, which causes the above sweeping-up phenomenon, leading to the unclear edges of the printed images. Even in this case, however, if the pigment ratio is about 30% to 70% and a moderate amount of a dye is intermingled with the pigment, the sweeping-up phenomenon can be prevented by the reaction of the dye with the treating liquid which provides the ink with a high viscosity. Thus a relatively good result can be obtained on sharpness of the printed images.

Strike-through

OD of the-solid print was measured from the back side of the paper and the measured values were used as an index of strike-through. As described above, the printed image with lower OD is considered to be better in strike-through. Concretely, the plain paper used was about 80 $\mu$m thick and relatively easy to undergo strike-through; accordingly, if OD measured from the back side of the paper was about 0.3 or less, the ink was judged to be good in strike-through.

Figure 9:
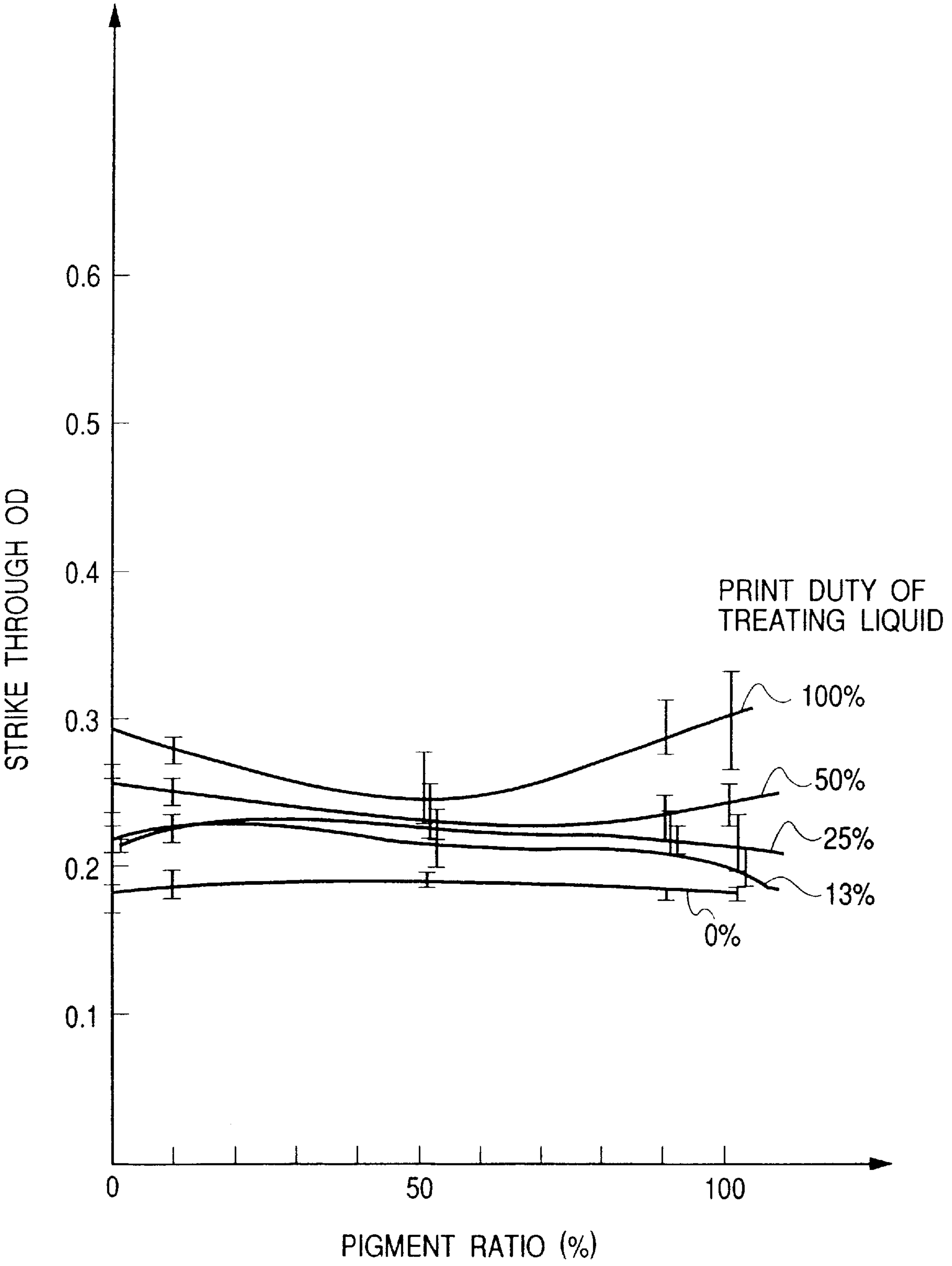
FIG. 9 is a chart showing the relationship between pigment ratio and strike-through OD in a printing experiment according to an embodiment of the present invention with printing duty of treating liquid as a parameter.
Figure 10:
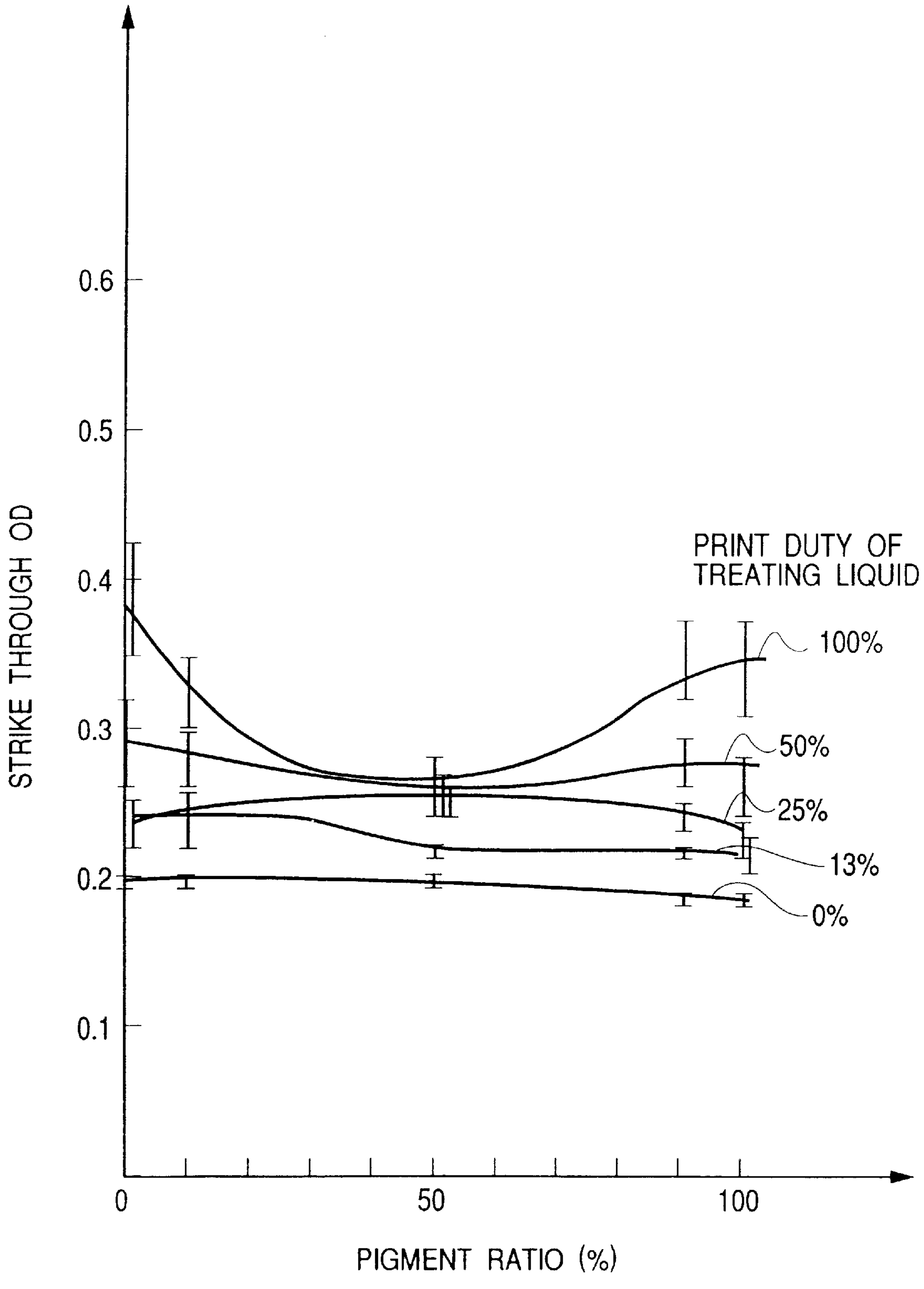
FIG. 10 is a chart showing the relationship between pigment ratio and strike-through OD in a printing experiment according to an embodiment of the present invention with printing duty of treating liquid as a parameter.
Figure 11:
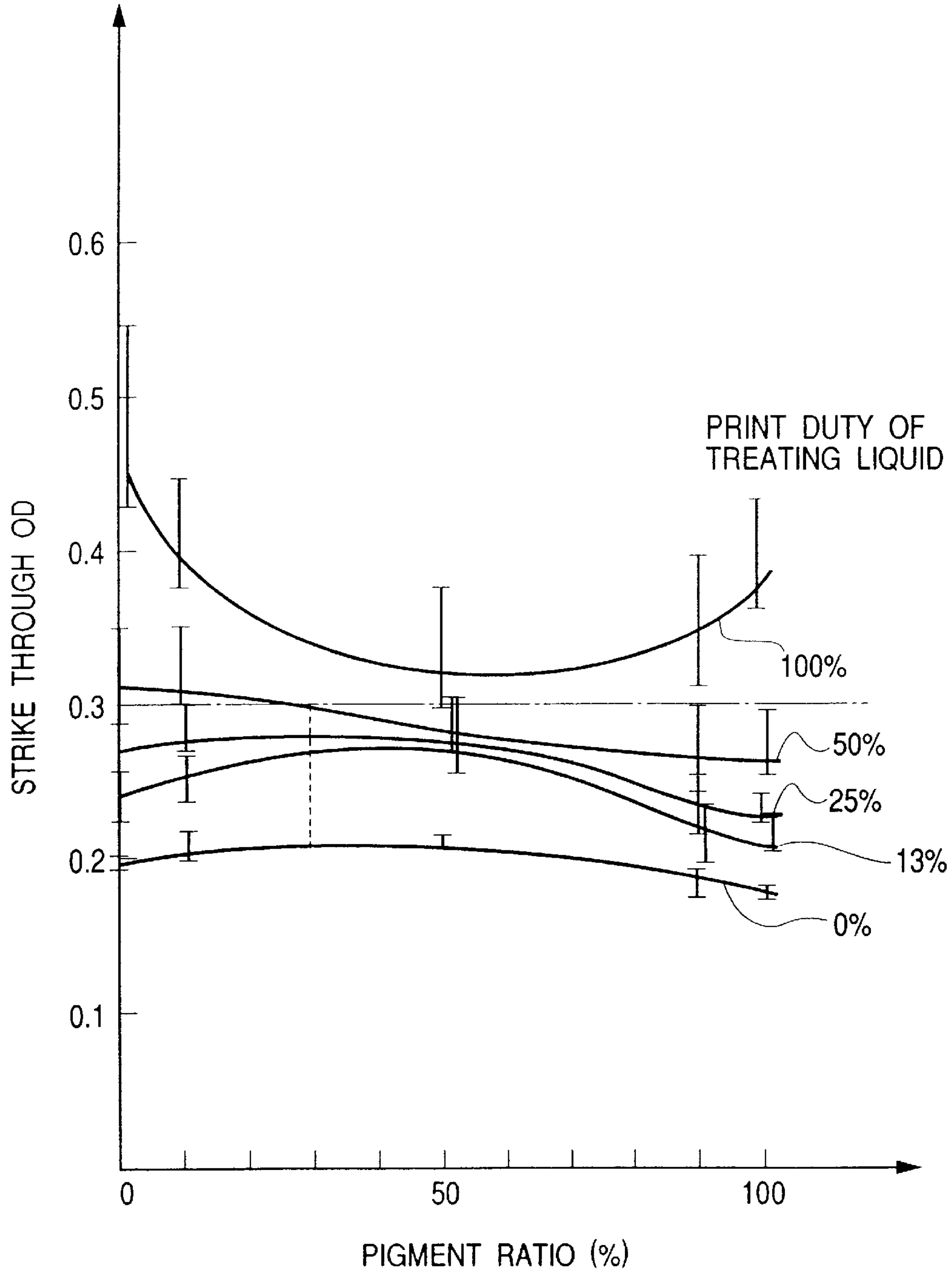
FIG. 11 is a chart showing the relationship between pigment ratio and strike-through OD in a printing experiment according to an embodiment of the present invention with printing duty of treating liquid as a parameter.

FIGS. 9 to 11 are views showing the relationship between the pigment ratio and strike-through OD in cases where the deliveries of the Bk ink are 18 pl, 30 pl and 36 pl, respectively, using the printing duty of the treating liquid as a parameter.

The printing experiment as shown in the above drawings leads to the following conclusions.

First, when the ejection amount of the Bk ink is in the range of about 15 pl to about 40 pl, OD is about 0.2, as long as the treating liquid is not printed (in FIGS. 9 to 11, the printing duty is 0%). This may be because most of the ink used was absorbed into the surface layer of the paper (swelling) since the embodiment of the present invention does not use the treating liquid with a high penetrability. Because of this, the fixing time required for this absorption was more than 20 seconds.

On the other hand, even if the treating liquid is printed, when the ejection amount of the Bk ink is as small as 18 pl or less, OD is almost always 0.3 or less. This is the indication that strike-through is satisfactory. The lower the printing duty of the treating liquid becomes, the better strike-through becomes, because, with the decrease in the printing duty of the treating liquid, it becomes harder for the coloring materials of the ink to penetrate the paper.

As described above, the lower the printing duty of the treating liquid becomes, the better strike-through becomes. Taking into account the ejection amount of the Bk ink, however, when the ejection amount is in the range of from 18 pl to 36 pl, OD is almost always 0.3 or less, as long as the printing duty of the treating liquid is 50% or less, and strike-through is satisfactory.

When the ejection amount of the Bk ink is in the range of 18 pl to 30 pl, even if the penetrability is increased by setting the printing duty of the treating liquid for 100%, it is hard for the coloring materials having reacted with the treating liquid to penetrate into paper under the condition that the pigment ratio is 30% to 70%. Thus, satisfactory strike-through can be obtained.

The experimental result on strike-through described above is incompatible with the results on the aforementioned evaluation items, namely, fixing ability, OD and sharpness in that the higher the printing duty of the treating liquid becomes, the better the results become. As for the ejection amount of the Bk ink, however, the result on strike-through shows the same tendency as those of the above evaluation items except for OD in that the lower the ejection amount of the Bk ink becomes, the better the results become. Thus, it is a critical point how to make possible the absorption of the ink coloring materials intensively into the surface layer of the paper while keeping their amount suitable for both OD and strike-through and their fixing ability high. In light of this point, the present inventors have found a method of appropriately materializing the concept of ink-receiving parts with a treating liquid, as described below, and a method of ink-jet printing for controlling the formation of the above ink-receiving parts.

In this embodiment, since such a satisfactory strike-through is materialized, what is called double-side printing is made possible and the printing system with higher flexibility is also made possible.

The results of Experimental Example 1 described above were established when the content of PAA, a polymeric component of the treating liquid, was 3% to 4%. If the PAA content is reduced, there occurs a significant decrease particularly in OD. Thus, preferably ink. contains PAA in an amount about one-half to one time as much as that of the coloring materials.

The same experiment was carried out except that a printing resolution different from in Experimental Example 1, for example 360 dpi×720 dpi, was adopted. After investigating the results, it was found that almost the same results as Experimental Example 1 described above were obtained when the ink-ejection amount per pixel was the same. For example, when the ejection amount is set for 20 pl for the resolution of 600 dpi×600 dpi, the ejection amount per unit area becomes about 0.011 pl/$\mu m^2$, since one pixel is about 42.3 $\mu$m×42.3 $\mu$m.

EXPERIMENTAL EXAMPLE 2

In Experimental Example 1 described above, a self-dispersing type carbon black which contained no dispersant was used as a coloring material of pigment. In this Experimental Example, however, the experiment was carried out in the same manner as Experimental Example 1 using the Bk ink which contained carbon black, as a pigment, dispersed with a dispersant (for example, styrene-acrylic copolymer). And results similar to and different from those of Experimental Example 1 were obtained.

The similar result was involved with changes in OD with changes in the printing duty of the treating liquid, in particular, it was the phenomenon that, when the printing duty of the treating liquid was about 13%, OD was decreased.

On the other hand, the different result was involved with the pigment ratio. In this Experimental Example, when the pigment ratio was 50%, decrease in OD, deterioration in sharpness of solid-printed portions, and deterioration in strike-through were observed.

When the pigment ratio was 100%, although the above deterioration was not observed, the ink-ejection amount must be set for a relatively large value in order to obtain a desired OD. Moreover, it was confirmed that, in this type ink, ink fixing needed twice as long time as in the ink containing a self-dispersing type pigment even under the same conditions.

In the following the reasons for the above results will be described with reference to FIGS. 12A, 12B, 13A and 13B.

Figure 12B:
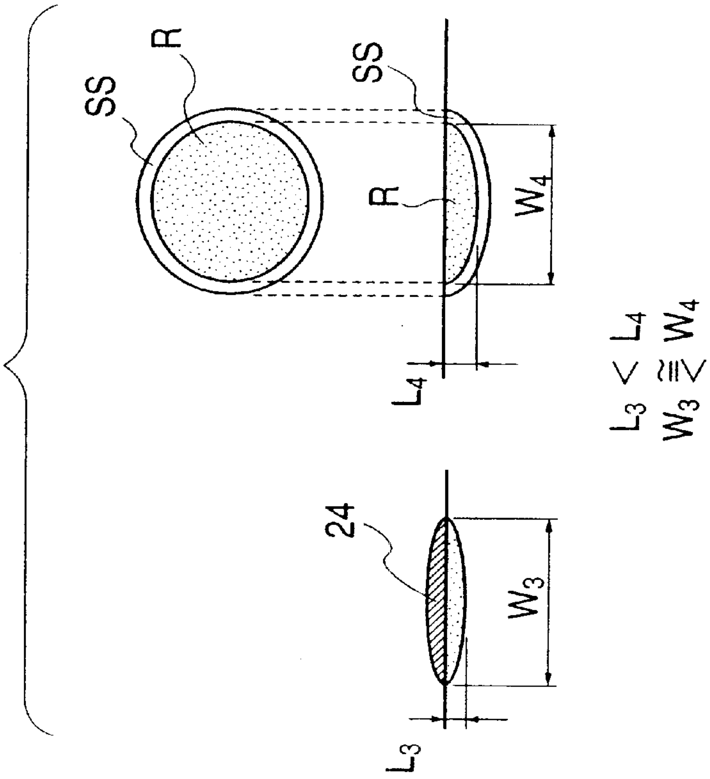
FIGS. 12A and 12B are explanatory views for illustrating a dot formation using ink containing only pigment as coloring material and a treating liquid.
Figure 12A:
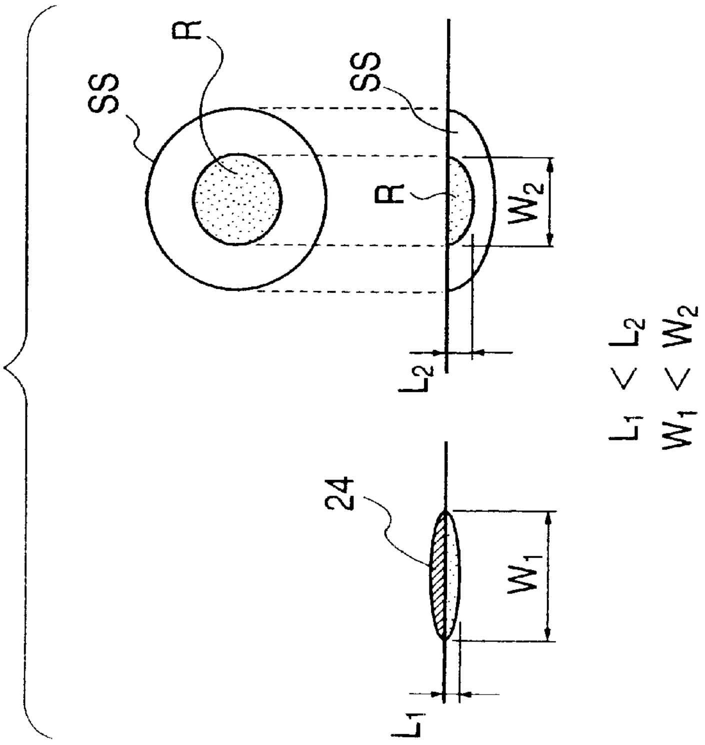
Figure 13B:
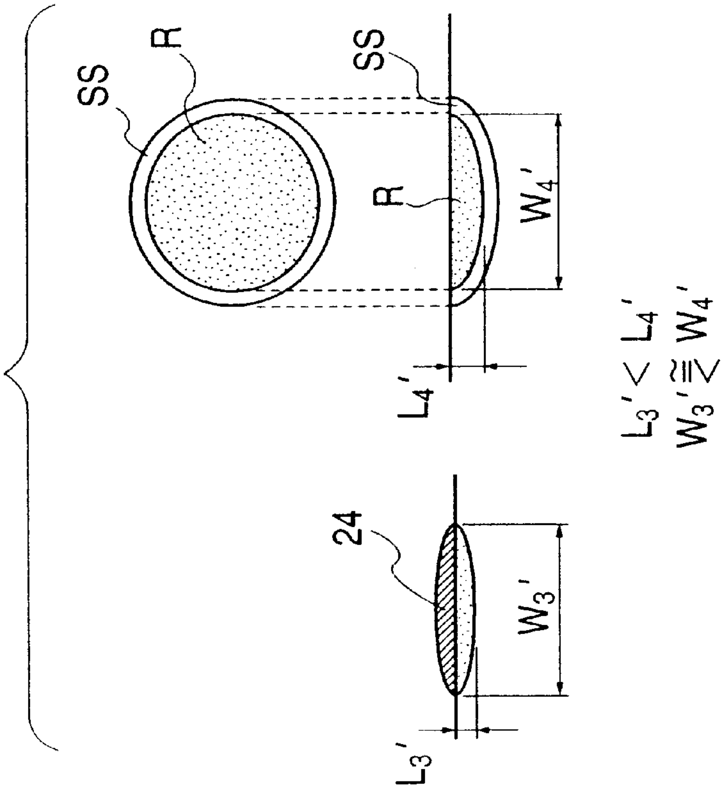
FIGS. 13A and 13B are explanatory views for illustrating a dot formation using ink containing pigment and dye as coloring material and a treating liquid.
Figure 13A:
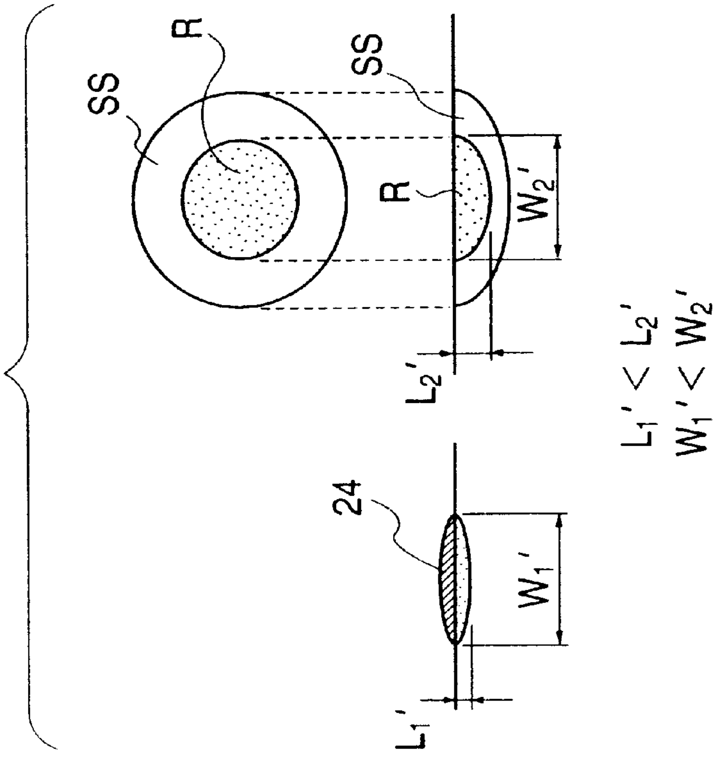

FIGS. 12A and 13A are views illustrating the dot formation when using pigment containing a dispersant just like in this Experimental Example. FIG. 12A shows the dot formation in cases where the pigment ratio is 100%, that is, where pigment alone is used as a coloring material and FIG. 13A in cases where both pigment and dye are used as coloring materials. On the other hand, FIGS. 12B and 13B are views illustrating the dot formation when using a self-dispersing type pigment containing no dispersant just like in Experimental Example 1. FIG. 12B shows the dot formation in cases where pigment alone is used as a coloring material, and FIG. 13B in cases where both pigment and dye are used as coloring materials.

From what are shown in FIGS. 13A and 13B, It is assumed that, when dye is intermingled with pigment and the dye ratio is relatively large, PAA in the treating liquid reacts mostly with the dye. In such a situation, it is considered that it is hard for an anionic dispersant to react with cationic PAA in the treating liquid. Since carbon black is dispersed with a dispersant, if PAA does not react with the dispersant very much, carbon black penetrates into paper together with the dispersant due to the high penetrability of the treating liquid. On the other hand, when assuming that PAA reacts with the dispersant very much, dye cannot react with PAA and penetrates into paper. Thus, in either case, it is considered that OD is decreased, strike-through is deteriorated because the coloring materials penetrates deeper in the direction perpendicular to the surface of the paper, and sharpness of the edges are also deteriorated. As for the dot diameters formed, when using a penetrating treating liquid SS, the dot diameters $W_2$' and $W_4$' can be formed equal to or larger than dot diameters $W_1$' and $W_3$' in cases where ink alone is used which contains pigment and dye as coloring materials, as seen from FIGS. 13A and 13B. Thus, relatively large dots can be formed with a relatively small amount of ink, which means that area factor can be made larger with a relatively small amount of an ink. As a result, first, the ink-ejection amount can be reduced, consequently the penetrating time of the ink can be shortened as a whole and the fixing ability is enhanced. Second, the ink-ejection amount can be set for the same as that of a color head, consequently black heads and color heads can be designed exactly in the same manner, which allows the lowering of costs.

In the case of FIG. 13B where no dispersant exists, the penetration depth of the-pigment contained in ink 24 is larger than that of the ink 24 using no treating liquid (L3'<L4') due to the penetrability of the treating liquid. The pigment and the dye, however, react with a reactive component in the treating liquid without fail, and they do not penetrate up to the front of the treating liquid penetrating the paper. Thus, while a high-speed fixing is achieved, an excellent image quality free from haze can be also obtained.

In FIGS. 12A, 12B, 13A and 13B, $L_1$ is a penetrated depth of the ink 24, $L_2$ is a penetrated depth of a reaction product R obtained by reacting the ink 24 with the treating liquid SS, $L_3$ is a penetrated depth of a pigment in the ink 24, in case of using no treating liquid SS, $L_4$ is a penetrated depth of a reaction product R obtained by reacting the ink 24 with the treating liquid SS, $L_1'$ is a penetrated depth of the ink 24, $L_2'$ is a penetrated depth of a reaction product R obtained by reacting the ink 24 with the treating liquid SS, $L_3'$ is a penetrated depth of a pigment in the ink 24, in case of using no treating liquid SS, and $L_4'$ is a penetrated depth of a reaction product R obtained by reacting the ink 24 with the treating liquid SS.

When the ink contains no dye, i.e., and the pigment ratio is 100%, the dispersant reacts with PAA, as shown in FIG. 12A. Since both the dispersant and PAA are high molecules, their bond strength is large and the pigment undergoes fixing in an instant. Thus drops of the ink having impacted the paper do not tend to spread laterally, and the dot diameters $W_2$ formed using the treating liquid jointly are sometimes smaller than the dot diameters $W_1$ formed using ink alone. Thus, it is considered that, when increasing the ink-ejection amount in order to enlarge the dots, combined with the decrease in its penetrating speed due to the coat formation of high molecules, the ink fixing time becomes longer.

Particularly, in cases where ink uses pigment containing no dispersant, as shown in FIG. 12B, even if the ink contains no treating liquid, the dot diameters become larger as compared with the cases where pigment contains a dispersant ($W_1<W_3$). The use of a treating liquid, however, allows the enlargement of the dot diameters ($W_3<(-)\ W_4$). Further, the use of both ink, which contains a self-dispersing pigment alone as a coloring material, and a treating liquid jointly allows the increase in penetration depth of the pigment ($L_3<L_4$). Still further, due to the reactive component in the treating liquid, the pigment hardly penetrates up to the front of the treating liquid SS penetrating the paper. In cases where ink uses pigment containing a dispersant but no dye, as a coloring material, jointly with a treating liquid, about 0.2% to 0.5% by weight of Acetylenol may be added to the ink in order to enlarge dot diameters. The addition of such an amount of Acetylenol allows the increase in ink penetration speed, the enlargement of dot diameters, and the enhancement of ink fixing ability.

(Ink-receiving part)

In the following a detailed description will be given with reference to FIGS. 14A to 14D of the use of the inkjet printing method utilizing a concept of "ink-receiving part", which has been built up based on the results of Experimental Examples 1 and 2 and the investigation of the same, and of the effects of such a method on printability including ink fixing ability.

In the embodiments of the present invention, in order to obtain particularly high Ink fixing ability, namely, a high ink penetrating speed, a treating liquid was used jointly with an ink, and the content of Acetylenol, a nonionic surface active agent, contained in the above treating liquid was set for 0.7% or more, the CMC of Acetylenol in water.

Ink-ejection amount

Figure 14A:
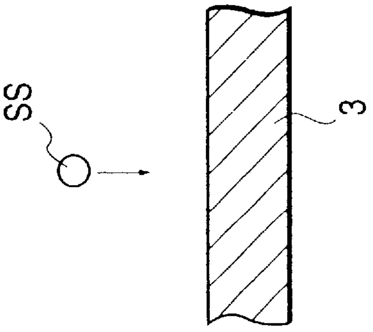
FIGS. 14A, 14B, 14C and 14D are explanatory views for particularly illustrating a formation of an ink-receiving part in a dot formation process according to an embodiment of the present invention.
Figure 14B:
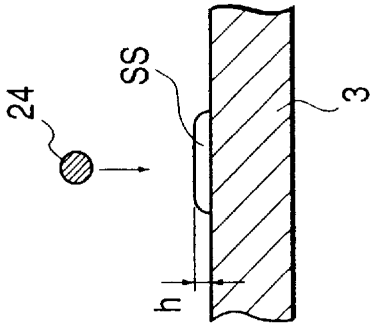
Figure 14C:
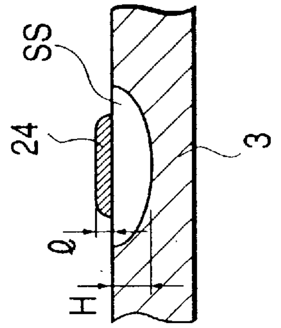
Figure 14D:
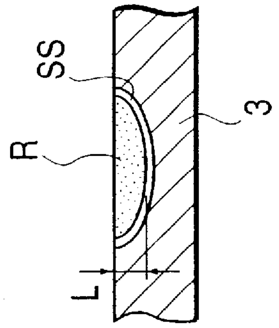

The present inventors' investigation has found that OD described above is determined by the reflection of light penetrating up to about 20 $\mu$m depth from the paper surface. Thus, the penetration depth L of the ink 24 finally fixed to the paper, as shown in FIG. 14D, is preferably within 20 $\mu$m. On the other hand, the average void rate of plain paper is about 50% (0.5), and a drop of the ink 24 penetrates at least up to the depth 1/0.5=2 times as large as the thickness l of the drops of the ink having impacted the paper (FIG. 14C). Accordingly, in order to fill all the ejected ink within, for example, 20 $\mu$m depth from the paper surface so that it can be reflected in OD, it is necessary to make the thickness l of the drops of the ink, which exist in the paper right after impacting the same, about 10 $\mu$m thick. As a result, when printing a single drop of ink in a single pixel of, for example, 600 dpi, a drop of ink is needed whose ejection amount is $42.3\ \mu m \times 42.3\ \mu m \times 10\ \mu m = 17{,}900\ \mu m^3$, namely, about 18 pl.

According to the investigation based on the results of the Experimental Examples, the required OD is materialized fairly well when the ink-ejection amount is 15 pl or more. Accordingly, the required thickness of the drop of the ink is considered to be about 8.4 $\mu$m per pixel; this almost agrees with the value, 10 $\mu$m, described above.

Ejection Amount of Treating Liquid

When ink is ejected in the amount specified above, the ejected ink must be promptly brought up to about 17 $\mu$m (8.4 $\mu$m×2) depth from the paper surface. Thus, in the embodiments of the present invention, the treating liquid SS is applied to the paper 3 prior to ink 24 as shown in FIGS. 14A and 14B so as to form ink-receiving parts of an appropriate thickness H as shown in FIG. 14C. As a result, the ejection amount of the treating liquid-must be as follows.

In other words, the depth L up to which the reaction product R of the treating liquid SS and the ink 24 provided subsequent to SS exists is made a desired value within 20 $\mu$m by controlling the depth of the ink-receiving parts of the treating liquid SS to be kept H.

As a precondition, for the printing pattern of the treating liquid, it is preferable that basically at least one drop of the treating liquid is printed for each pixel. The reason is that, with this pattern, ink-receiving parts can be formed more uniformly for each pixel. And in order to allow the ink to have a desired thickness in the direction perpendicular to the paper surface, the ejection amount of the treating liquid SS is defined, for example, as follows.

Since the average thickness of the drops of the ink on the paper is about 8.4 $\mu$m for each pixel, as described above, the depth of the ink-receiving layer of the paper is about 17 $\mu$m which is almost two times as large as the above average thickness.

On the other hand, it has been found by the investigation based on the experiments described above that ink may be fixed to paper within several seconds if high-penetrable treating liquid has been printed on the paper previously in an amount about one eighth of the ink amount. Thus, when the ink-ejection amount is about 15 pl or more as described above, at least one drop of the treating liquid whose amount is about 2 pl or more is needed for each pixel. Under such conditions, the thickness of the treating liquid SS right after impacting the paper 3, as shown in FIG. 14B, is 1 $\mu$m or more. On the other hand, if the thickness of the treating liquid SS is more than 10 $\mu$m for each pixel, undesirably a remarkable strike-through occurs.

As a result, preferably the ejection amount of the treating liquid SS is defined so that its average thickness h right after impacting the paper 3 will be 1 $\mu$m to 10 $\mu$m.

Printing Pattern of Treating Liquid (Printing Duty)

In light of the above points, the printing pattern of the treatment liquid is preferably such that, even when what is called thinning printing is carried out in which one dot is printed for multiple pixels based on the image data, the average thickness of the treating liquid right after impacting the paper is also 1 $\mu$m to 10 $\mu$m, taking into account the overlapping of the liquid drops after printing.

Furthermore, the printing pattern is preferably such that drops of ink come into contact with the treating liquid. Thus, on the average on the surface of papers the treating liquid is preferably printed at a printing duty of at least ⅙ pixel or more. This means that, when the dot diameter of the treating liquid is set for the maximum which the actual print head possibly forms, the printing duty enabling the contact of the treating liquid with all the ink ejected on the paper is ⅙.

In the following the average thickness of the treating liquid right after impacting the paper, as described above, will be explained with respect to area factor (AF). According to the Investigation based on the aforementioned experimental results, the average coverage of the ink-receiving layer on the paper, namely, AF is preferably 50% or more in order to obtain a high OD. In other words, with a printing resolution of 600 dpi, the printing duty must be ¼ (25%) (refer to FIG. 1) when the ejection amount of the treating liquid is about 15 pl, and it must be ⅛ of printing duty when the ejection amount of the same is about 30 pl.

It is known that, when liquid drops impact paper in an ejection amount of 5 pl to 100 pl and at an ejection speed of 5 m/s to 15 m/s, the ejected liquid drop is deformed into a cylindrical shape with a diameter twice as large as the original drop. In such a case, if the liquid drop is less penetrable, dots with almost the same diameter as the above are obtained. On the other hand, if the liquid drop is highly penetrable like the treating liquid of the present embodiments, since the liquid subsequently penetrates the paper in the direction parallel to its surface, dots with a diameter about 2.6 times as large as that of the original drops are obtained. Hereinafter the value 2.6 is referred to as a bleeding rate N.

If the ejection amount of the treating liquid is Vd [$10^3\mu$m=1 pl], a dot diameter D can be calculated by the equation:

$$D=2N(3Vd/4\pi)^{1/3}(\mu m).$$

When printing is carried out with a printing resolution DPI (dpi) and at a printing duty Hs of the treating liquid, if overlapping does not occur, AF can be calculated by the equation:

$$AF=\frac{DPI^2\cdot\pi\cdot N^2\cdot\left(\frac{3}{4\pi}Vd\right)^{2/3}\cdot Hs}{25400^2}.$$

When DPI=600 dpi, bleeding rate N=2.6, and 15 pl of treating liquid is printed at a printing duty Hs=¼, AF becomes about 70%. When 30 pl of the ejection amount of treating liquid is printed at Hs=⅛, AF becomes about 50%. When 15 pl of the ejection amount of treating liquid is printed at Hs=1/4, although AF actually becomes about 70% due to the occurrence of overlapping, if the printing duty Hs is set for 20%, AF becomes 50%.

Thus, according to the investigation based on the experimental results, the relationship between the ejection amount of the treating liquid and the printing duty of the same which leads to preferable AF is described as follows. When the ejection amount of the treating liquid is 15 pl, the thickness of the liquid drop right after impacting paper is about 5 $\mu$m, and when the amount 30 pl, the thickness about 6.2 $\mu$m. It is apparent that these values are within the range of 1 $\mu$m to 10 $\mu$m described above.

As for the printing duty described above, it is preferably ½ or more in the edge portions of the image to be printed. This is because, when the printing duty is low in the edge portions, a dot empty degree along the edge portions becomes low, which prevents formation of satisfactory edges.

As described above, in one embodiment of the present invention, in order to form an ink-receiving layer preferable for the improvement in ink fixing ability, OD, sharpness of the printed image, and strike-through, a treating liquid is ejected prior to ink ejection. And the ejection amount of the treating liquid is set for an appropriate value in connection with the printing duty of the same, further the ejection amount of the ink ejected subsequent to the treating liquid is defined appropriately. Thereby, the range in which coloring materials of the ink exist can be controlled in the direction perpendicular to the paper surface particularly by allowing the ink to penetrate into the ink-receiving layer formed with the treating liquid. Consequently, satisfactory results are obtained especially for OD and strike-through.

The further improvement in printability is expected if the ejection amount of the ink used and the pigment ratio of the same are set for the preferable range, as shown in Table 1 as a result of Experimental Example 1, after the formation of the ink-receiving layer described above.

In the following a concrete example of the embodiment described above will be described with reference to the drawings.

Figure 15:
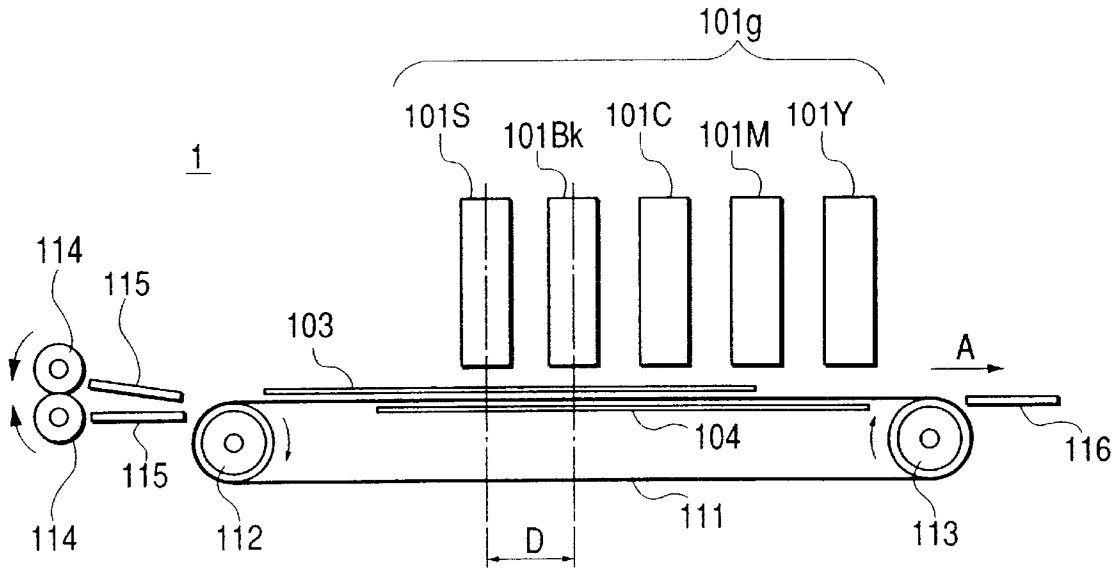
FIG. 15 is a side view showing schematic configuration of a printer according to an embodiment of the present invention.

FIG. 15 is a schematic view showing the rough configuration of a full line type printer according to the example of the present invention.

This printer 1 Adopts an ink-jet printing method in which printing is performed by the ejection of ink or treating liquid from a plurality of full line type print heads toward a recording medium as a printed medium, the print heads being arranged in a prescribed position along the direction (shown by an arrow A in the drawing) In which the above recording medium is conveyed. This printer operates under the control of a control circuit not shown in the drawing.

Each print head 101S, 101Bk, 101C, 101M and 101Y of the head group 101*g* has about 7,200 ink-ejection orifices arranged in the lateral direction of the recording paper conveyed in the direction shown by the arrow A in the drawing (in the direction perpendicular to the paper of this drawing) on it They can perform printing on the recording paper of the maximum size up to A3.

The recording paper 103 is conveyed in the direction shown by the arrow A by the revolution of a pair of resist-rollers 114 driven by a conveying motor, guided by a pair of guide plates 115 so that its tip undergoes registration, then conveyed by a conveying belt 111. The conveying belt 111, which is an endless belt, is held with two rollers 112 and 113, and up and down displacement of its upper portion is regulated with a platen 104. The recording paper 103 is conveyed by the revolution of the roller 113. The recording paper 113 is stuck to the conveying belt 111 by the electrostatic holding. The roller 113 is driven to revolve with a driving source, such as a motor, not shown in the drawing so that the recording paper 103 can be conveyed in the direction shown by the arrow A. The recording paper 103 having been subjected to recording with the recording head group 101*g* while being conveyed on the conveying belt 111 is delivered on a stocker 116.

Each print head of the recording head group 101*g* causes bubbles in a liquid utilizing thermal energy and ejects the liquid with the pressure of the above bubbles. And the recording head group 101*g* contains a head 101S for ejecting the treating liquid described in the above embodiment, a head 101Bk for ejecting a black (Bk) ink, and heads for ejecting color inks (a Cyan head 101C, a Magenta head 101M and a Yellow head 101Y). These heads are arranged along the direction A in which the recording paper 103 is conveyed, as shown in FIG. 15. Printing black characters and color images is made possible by the ejection of each type of color ink and the treating liquid from each print head.

In this example, for the black ink ejected from the head 101Bk, ink with a low penetrating speed (hereinafter referred to as "overlapping ink") is adopted. And for the treating liquid, the cyan ink, the magenta ink and the yellow ink ejected from the head 101S, 101C, 101M and 101Y, respectively, a treating liquid with a high penetrating speed and ink with a high penetrating speed (hereinafter referred to as "high-penetrable ink") are adopted.

Now, a brief description of penetrating speed will be given.

It is known that, when representing penetrability of a treating liquid or ink (hereinafter referred to as simply "liquid") by a liquid amount V per $m^2$, the penetration amount of the liquid V (the unit is $ml/m^2=\mu m$) at a time t elapsed after ejecting the liquid drops is expressed by the Bristow's equation;

$$V=Vr+Ka\ (t-tw)^{1/2}$$

wherein t>tw.

Right after a liquid drop has dropped on a recording paper, most of the liquid drop is only absorbed into the uneven portions of the paper surface (rough portions on the surface of the recording paper), and little liquid penetrates into the inside of the recording paper. The term tw (wet time) represents the time during which little liquid penetrates into the inside of the recording paper, and the term Vr represents the liquid amount absorbed into the uneven portion during such a time. When the penetration time after dropping the liquid drops exceeds tw, the penetration amount V increases by the amount proportional to the excess (t−tw) to the ½ power. Ka represents the proportionality constant of the increment and its value is dependent on the penetrating speed.

Figure 16:
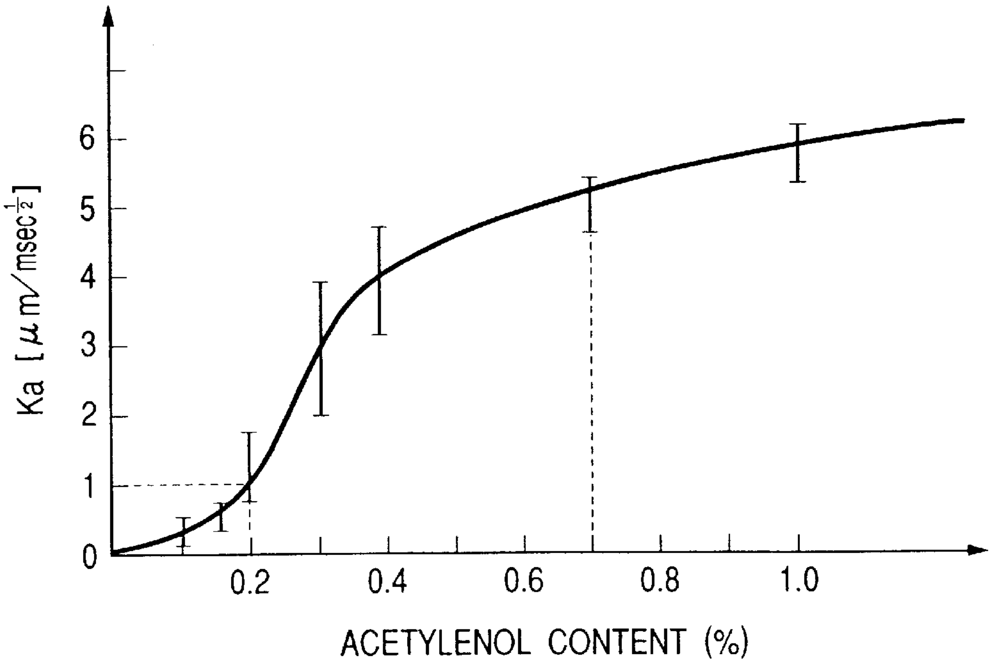
FIG. 16 is a chart showing the relationship between percentage content of acetylenol and Ka value on penetrability in the embodiment.

FIG. 16 is a view graph showing the values of the proportionality constant Ka corresponding to the Acetylenol content of the liquid obtained by the experiments.

The value Ka was measured with Dynamic Penetrability Tester S (manufactured by Toyo Seiki Seisakusyo) which measures the dynamic penetrability of liquid by the Bristow's method. In the experiments of the present invention, PB paper from Canon Inc., which is an applicant of the present invention, is used as recording paper. This PB paper is applicable to both copying machine and LBP using the electrophotographic method and printers using the ink-jet recording method.

The same results could be obtained when using PPC paper, which is electrophotographic paper from Canon Inc.

The curve in FIG. 16 shows the increase in Ka value (vertical axis) with the increase in Acetylenol content (horizontal axis), and the proportionality constant Ka is dependent on the Acetylenol content. Accordingly, the penetration speed of the ink can be said to be substantially dependent on the Acetylenol content. In the drawing, the line segments parallel to the vertical axis and intersecting the curve show the range of variations in the measured results.

Figure 17A:
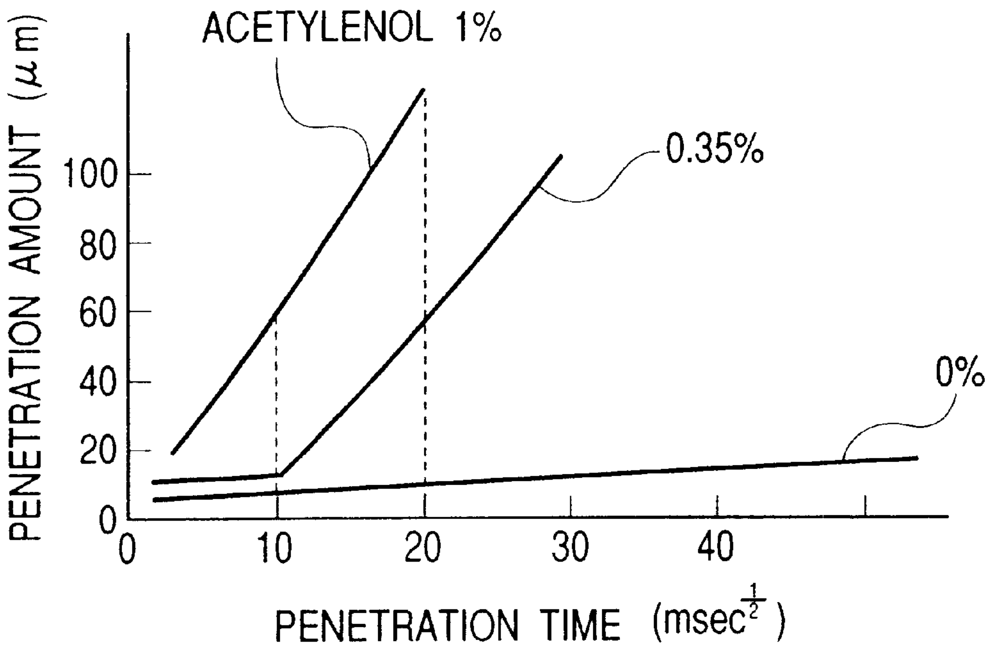
FIGS. 17A and 17B are charts showing the relationship between penetration time after impact and an amount of penetration with the percentage content of acetylenol relating to penetrability as a parameter, respectively.
Figure 17B:
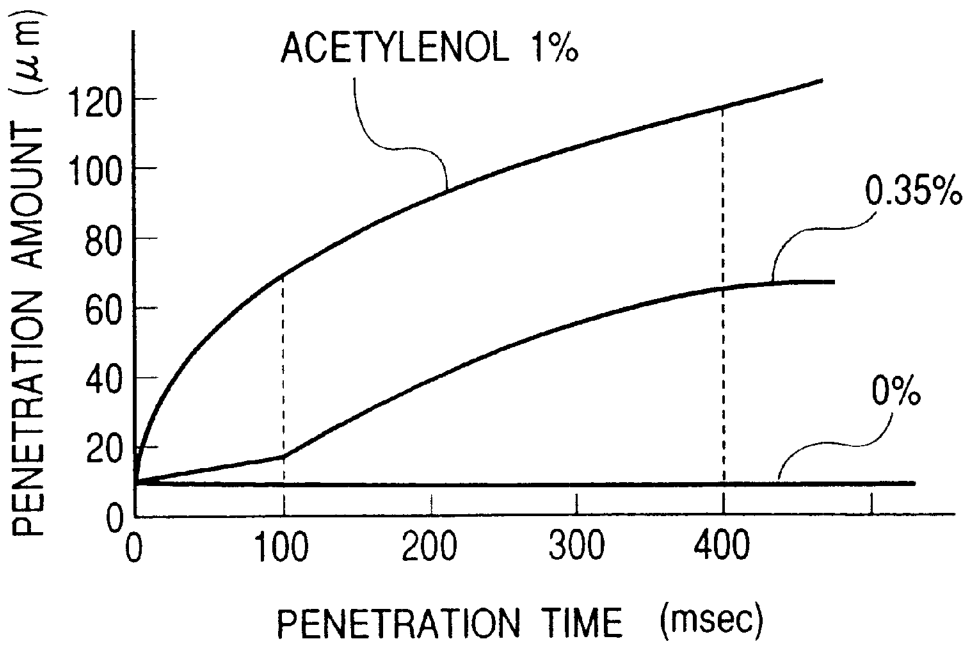

FIGS. 17A and 17B are characteristic graphs showing the relationship between the ink-penetration amount and the penetration time which was obtained from the results of the experiments carried out using the above recording paper (PB paper) whose weight, thickness and void rate are 64 $g/m^2$, about 80 $\mu$m and about 50%, respectively.

In FIG. 17A, the horizontal axis shows the penetration time represented by one-half power of millisecond ($msec^{1/2}$), and in FIG. 17B, the horizontal axis shows the penetration time represented by millisecond (msec). In both FIG. 17A and FIG. 17B, the vertical axes show the penetration amount V ($\mu$m). Those drawings show a relation between the penetration time and the penetration amount when the Acetylenol content is 0%, 0.35% and 1% by weight, respectively.

As apparent from both drawings, the penetration amount corresponding to the penetration time increases with the increase in the Acetylenol content, in other words, the higher the Acetylenol content becomes, the higher the ink penetrability becomes. The graphs in FIGS. 17A and 17B show the tendency for the wet time tw to decrease with increase in the Acetylenol content and the tendency for the penetrability to increase with increase in the Acetylenol content even when the time does not reach tw.

In the case where no Acetylenol is mixed into a liquid (the Acetylenol content is 0%), the penetrability of the liquid is low, and such a liquid (ink) has characteristics as an overlapping ink specified below. In the case where Acetylenol is mixed into a liquid in the proportion of 1% by weight, the liquid has the characteristic of penetrating into the recording paper 103 in a short time which is a characteristic as a high-penetrable ink specified below. And the ink mixed with Acetylenol in the proportion of 0.35% by weight has a moderate characteristic between the above two, as semi-penetrable ink specified below.

The characteristics of "overlapping ink", "high-penetrable ink" and "semi-penetrable ink" having a moderate characteristic of the above two are shown in Table 2.

TABLE 2

| | Ka Value ($ml/m^2 \cdot msec^{1/2}$) | Acetylenol Content (%) | Surface Tension (dyn/cm) |
|---|---|---|---|
| Overlapping Ink | less than 1.0 | less than 0.2 | 40 or larger |
| Semi-penetrable Ink | 1.0 or more and less than 5.0 | 0.2 or more and less than 0.7 | 35 or larger and smaller than 40 |
| High-penetrable Ink | 5.0 or more | 0.7 or more | smaller than 35 |

Table 2 above shows Ka value, the Acetylenol content (%), surface tension (dyn/cm) of each of "overlapping ink", "high-penetrable ink" and "semi-penetrable ink", respectively. The penetrability of each ink to the recording paper as a printed medium increases with the Increase in Ka value. In other words, it increases with the decrease in surface tension.

Ka values shown in Table 2 were measured by using Dynamic Penetrability Tester S (manufactured by Toyo Seiki Seisakusho), which measures the dynamic penetrability of liquid by the Bristow's method. In the experiments, PB paper from Canon Inc., which is an applicant of the present invention, was used as recording paper. And the same results were obtained when using PPC paper, manufactured by Canon Inc.

It is known that, when a surface active agent is added to a liquid, one of the requirements to be taken into consideration is the critical micelle concentration (CMC) of the surface active agent in the liquid. The critical micelle concentration means the concentration at a time when several tens of molecules rapidly associate with each other and form a micelle. Such a phenomenon occurs as a result of the increase in the content of a surface active agent in a liquid. Acetylenol contained in the above liquid to adjust the penetrability is one type of surface active agent, and there also exist critical micelle concentrations of Acetylenol depending on the liquid type.

The relationship between Acetylenol content and surface tension obtained by observing the change in surface tension while adjusting the Acetylenol content is such that the surface tension does not decrease when Acetylenol begins to form micelles. And it has been confirmed from the above relationship that the critical micelle concentration (CMC) of Acetylenol in water is about 0.7%.

On checking both the critical micelle concentrations of Acetylenol in the drawings and Table 2 above, it is apparent that "high-penetrable ink" specified in Table 2, for example, is a type of ink which contains Acetylenol in a proportion larger than its critical micelle concentration in water.

The compositions of the treating liquid and each type of ink used in this example are as follows. Each proportion is shown as parts by weight, and the total proportions become 100 parts.

| | |
|---|---|
| [Treating Liquid] | |
| glycerol | 7 parts |
| diethylene glycol | 5 parts |
| Acetylenol EH (manufactured by Kawaken Fine Chemicals Co., Ltd.) | 0.7–2.0 parts |
| polyallylamine (molecular weight: 1,500 or less, average about 1,000) | 4 parts |
| acetic acid | 4 parts |
| benzalconium chloride | 0.5 part |
| triethylene glycol monobutylether | 3 parts |
| water | Balance |
| [Yellow (Y) Ink] | |
| C.I. Direct Yellow 86 | 3 parts |
| glycerol | 5 parts |
| diethylene glycol | 5 parts |
| Acetylenol EH (manufactured by Kawaken Fine Chemicals Co., Ltd.) | 1 part |
| water | Balance |
| [Magenta (M) Ink] | |
| C.I. Acid Red 289 | 3 parts |
| glycerol | 5 parts |
| diethylene glycol | 5 parts |
| Acetylenol EH (manufactured by Kawaken Fine Chemicals Co., Ltd.) | 1 part |
| water | Balance |
| [Cyan (C) Ink] | |
| C.I. Direct Blue 199 | 3 parts |
| glycerol | 5 parts |
| diethylene glycol | 5 parts |
| Acetylenol EH (manufactured by Kawaken Fine Chemicals Co., Ltd.) | 1 part |
| water | Balance |
| [Black (Bk) Ink] | |
| pigment dispersion | 25 parts |
| Food Black 2 | 2 parts |
| (in cases where the pigment ratio is 50%) (50 parts of a 10% by weight of pigment dispersion was used in the case where the pigment ratio was 100%, and 4 parts of Food Black 2 was used in the case where the pigment ratio was 0%, or a dye ratio was 100%.) | |

-continued

| | |
|---|---|
| glycerol | 6 parts |
| triethylene glycol | 5 parts |
| Acetylenol EH (manufactured by Kawaken Fine Chemicals Co., Ltd.) | 0.1 part |
| water | Balance |

In the following the pigment dispersion listed above will be described.

[Pigment Dispersion]

In the solution in which 5 g of concentrated hydrochloric acid was dissolved in 5.3 g of water, 1.58 g of anthranilic acid was added at 5° C. This solution was constantly kept at 10° C. or lower by stirring In an ice bath, and the solution in which 1.78 g of sodium nitrite was added to 8.7 g of water at 5° C. was added. The solution thus obtained was further stirred for 15 minutes, and 20 g of carbon black with a surface area of 320 $m^2/g$ and a DBP oil absorption of 120 ml/100 g was added in a mixed state. After that, the solution was stirred for an additional 15 minutes. The slurry thus obtained was filtered with Toyo filter paper No. 2 (manufactured by Advantes Co., Ltd. ), and its pigment particles were fully washed with water, and dried in an oven at 110° C. Then, a 10% by weight pigment dispersion was prepared by adding water to the above pigment. Thus, a pigment dispersion 3 was obtained in which self-dispersing carbon black anionically charged having a hydrophilic group bound on its surface via a phenylene group, as shown by the formula

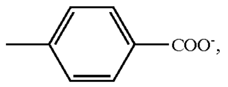

was dispersed.

As apparent from each composition above, the black ink was set as an overlapping ink, and the treating liquid and each of C, M and Y inks were set as a high-penetrable ink, by adjusting the Acetylenol content.

In the black ink, pigment without dispersant, what is called dispersant-free pigment, was used, as described in the aforementioned embodiments. In this ink, preferably used is a self-dispersing type carbon black in which at least one kind of hydrophilic group, as a carbon black dispersing element, is bound to the surface of the carbon black directly or via other atomic groups. And as a self-dispersing type carbon black, one having ionicity and an anionic charge is preferably used.

The types of the hydrophilic groups bound to the surface of the anionically charged carbon black include, for example, —COOM, —$SO_3M$, —$PO_3HM$ and —$PO_3M_2$ wherein M represents hydrogen atom, alkaline metal, ammonium or organic ammonium. In this example, the anionically charged carbon black with —COOM, —$SO_3M$ bound on its surface is preferably used.

The alkaline metals as "M" in the above hydrophilic groups include, for example, lithium, sodium and potassium, the types of the above organic ammonium includes, for example, mono-, di- or tri-methyl ammonium, mono-, di- or tri-ethyl ammonium, and mono-, di- or tri-methanol ammonium. The methods of obtaining anionically charged carbon black include, for example, a method of introducing —COONa on the surface of carbon black by subjecting the carbon black to oxidation treatment with sodium hypochlorite. These examples are, however, not intended to limit the present invention.

In this example, carbon black with a hydrophilic group bound on its surface via other atomic groups is preferably used. The other atomic groups include, for example, an alkyl group with 1 to 12 carbon atoms, a phenyl group possibly with substituents and naphthyl groups possibly with substituents. The concrete examples of the hydrophilic groups bound on the carbon black surface via other atomic groups include, for example, —$C_2H_4COOM$, —$PhSO_3M$ and —PhCOOM (wherein Ph represents a phenylene group) in addition to the ones described above. These examples are, however, not intended to limit the present invention.

Since the dispersant-free pigment of carbon black described above is in itself excellent in water-dispersibility as compared with the conventional carbon black, there is no need to add any pigment dispersing resins or surface active agents. Thus, it has the advantage over the conventional pigment in, for example, sticking tendency and wettability, and it is significantly reliable when being used for print heads.

The use of the black ink according to this example as described above allows the homopolar carbon particles and black dye to mix with each other and also allows the dispersing liquid to deposit to the ink-receiving layer formed with the penetrable treating liquid containing heteropolar high molecules, thereby forming dots.

In this example, the ink-ejection orifices of each ink head are arranged with a density of 600 dpi, and printing is performed in the direction in which recording paper is conveyed with a density of 600 dpi. Thus, the dot density of the images or the like printed in this example is 600 dpi in both the row and the column directions. The ejection frequency of each head is 4 kHz, accordingly, the conveying speed of the recording paper is about 170 mm/sec. The distance D of the head 101Bk for Bk ink from the head 101S for the treating liquid (refer to FIG. 15) is 40 mm, accordingly, the time after the ejection of the treating liquid till the ejection of the Bk ink is about 0.24 second. The ink-ejection amount of each print head shall be 15 pl per ejection in Example 1 below.

Figure 18:
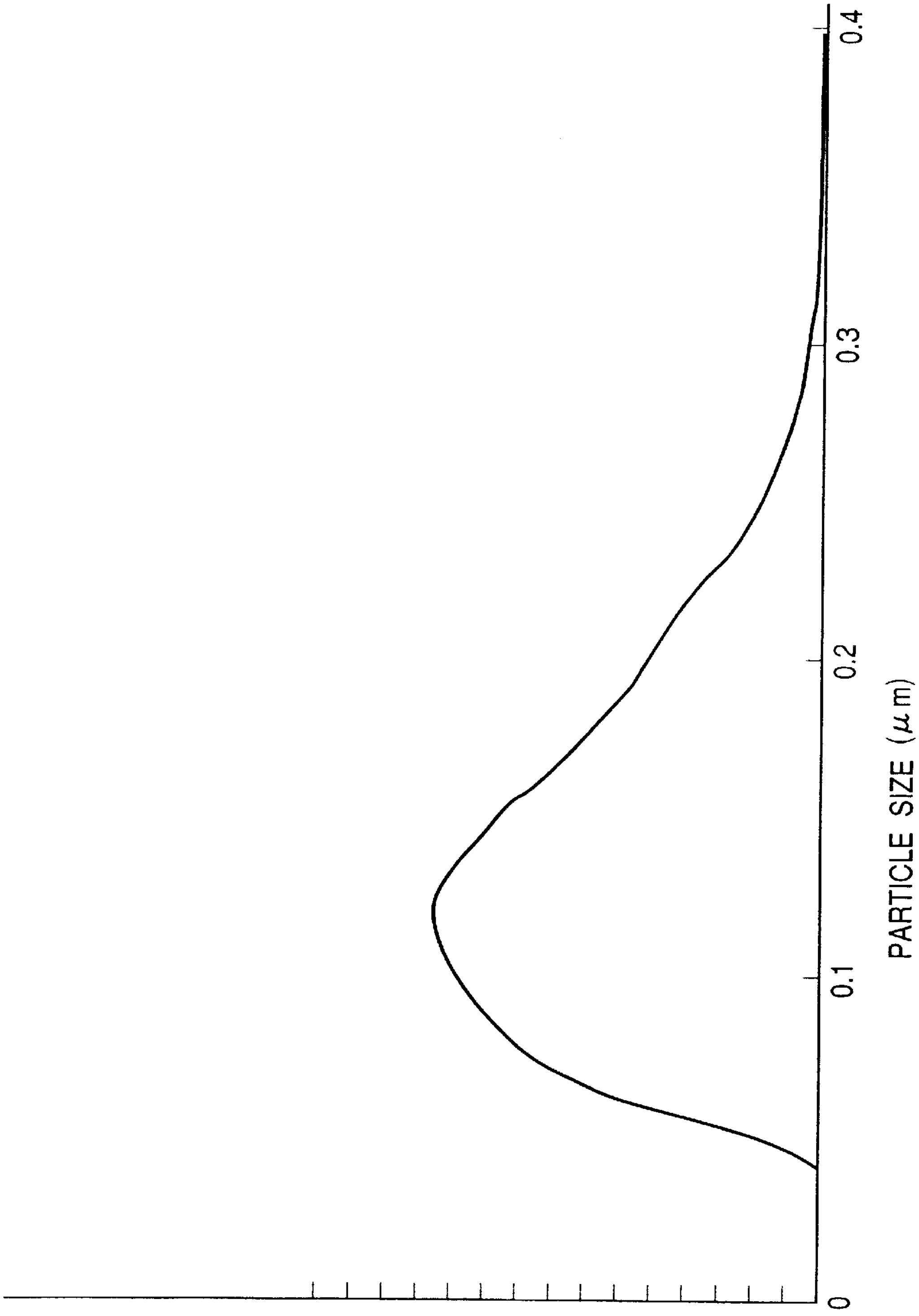
FIG. 18 is a chart showing particle diameter distribution of pigment used in the embodiment.

FIG. 18 shows the particle size distribution of the self-dispersing type pigment used in this example. As shown in the drawing, the particle. diameters of most pigment are within the range of 0.04 μm to 0.4 μm, and the average diameter is within the range of 0.1 μm to 0.15 μm.

The particle size distribution of the above pigment was measured with the laser scattering method.

In the following some of the concrete examples of the examples described above will be described.

EXAMPLE 1

In this example with respect to the Bk ink, the pigment ratio was set for 100% , and the ink-ejection amount was set for 15 pl. Under such conditions, the thickness of a drop of the Bk ink right after impacting paper was about 8.4 μm. On the other hand, the printing duty of the treating liquid was set for 50%, the ejection amount of the same was set for 15 pl. Under such conditions, the thickness of a drop of the treating liquid right after impacting paper was about 5 μm.

In the configuration of this example, the ejection amount of the Bk ink at the time of printing (or the other types of color ink) and that of the treating liquid is the same, accordingly all the heads can be produced in the same manner. This is advantageous in terms of productivity as well as in cost.

According to the results of the printing in this example, the fixing time of the Bk ink at the time of printing was within 1 second, OD was about 1.5, sharpness in the edge portions of the printed images was satisfactory, and strike-through was also satisfactory with OD lower than the desired value (for example, 0.3).

As for conditions under which the above printing results of this example are obtained, the pigment ratio of the Bk ink is not necessarily 100%. If it is 90% or more, the same results can be obtained. The printing duty is not necessarily 50%, either. If it is within the range of 25% to 50%, the above desired effects can be obtained with respect to printability.

EXAMPLE 2

In this example, the pigment ratio of the Bk ink was set for 50%, and the ink-ejection amount was set for 22 pl. Under such conditions, the thickness of a drop of the Bk ink right after impacting paper was about 12.3 μm. On the other hand, the printing duty of the treating liquid was set for 100%, the ejection amount of the same was set for 15 pl. Under such conditions, the thickness of a drop of the treating liquid right after impacting paper was about 8.4 μm.

According to the results of the printing in this example, the fixing time of the Bk ink was within about 1 second even if plain paper, poor in fixing ability, was used. OD was 1.5 or higher. And sharpness and strike-through were both satisfactory. In order to obtain the above desired results, the printing duty of the treatment liquid is not necessarily 100%. If it is within the range of 25% to 100%, the above desired results can be obtained; particularly satisfactory results, however, can be obtained when the printing duty is 100%.

EXAMPLE 3

In this example, the ejection amount of the Bk ink was set for 12 pl, and two drops were printed on one pixel. On the other hand, the ejection amount of the treating liquid was set for 12 pl and the printing duty of the same was set for 100%, in other words, one drop was printed on one pixel. Under such conditions, the thickness of a droplet of the treating liquid drops right after impacting paper was about 6.7 μm.

As seen from the above result, the heads for the Bk ink and the treating liquid can be constructed in the same manner while the ejection amount of the Bk ink is set for the doubled amount, 24 pl, of that of the treating liquid.

EXAMPLE 4

In this example, the pigment ratio of the Bk ink was set for 75%, and the ink-ejection amount was set for 27 pl. Under such conditions, the thickness of a drop of the Bk ink right after impacting paper was about 15 μm. On the other hand, the printing duty of the treating liquid was set for 50%, the ejection amount of the same was set for 15 pl.

If the printing duty of the treating liquid is within the range of 25% to 50%, the desired printability can be obtained, particularly satisfactory results, however, can be obtained when the printing duty is 50%.

EXAMPLE 5

This example was carried out under the same conditions as in Example 4, except that the ejection amount of the treating liquid was 27 pl. In this case, the printing duty of the treating liquid was preferably set for 25%. Under such conditions, the thickness of a droplet of the treating liquid right after impacting paper was about 3.7 μm.

EXAMPLE 6

In this example, the pigment ratio of the Bk ink was set for 90%, and the ink-ejection amount was set for 33 pl.

Under such conditions, the thickness of a drop of the Bk ink right after impacting paper was about 18.4 μm. On the other hand, the ejection amount of the treating liquid was set for 15 pl and the printing duty of the same was set for 50%.

EXAMPLE 7

This example-was carried out under the same conditions as in Example 6, except that the ejection amount of the treating liquid was 33 pl and the printing duty of the same was set for 12.5%. Under such conditions, the thickness of a drop of the treating liquid right after impacting paper was about 6.6 μm and AF was about 59%.

Figure 19:
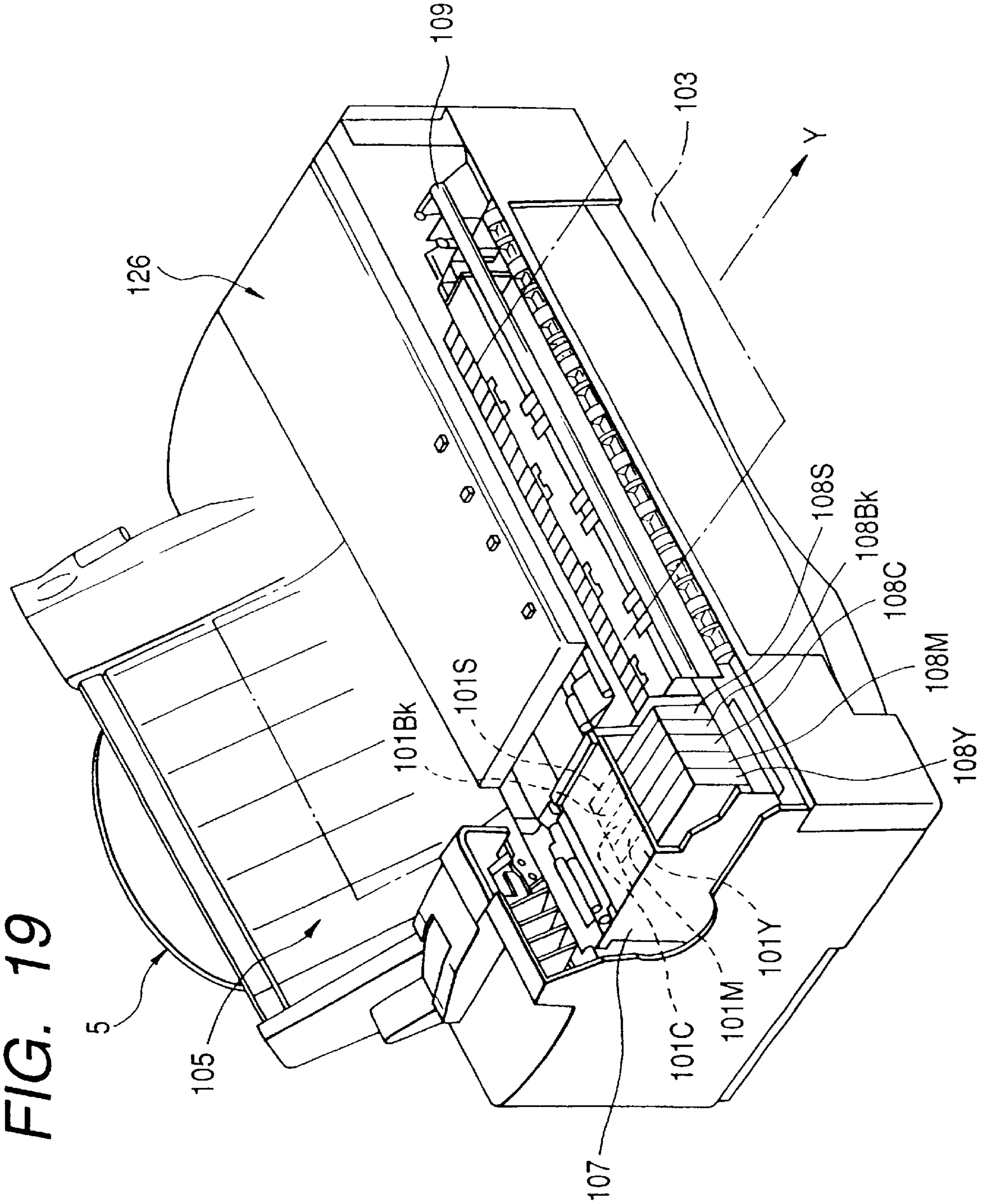
FIG. 19 is a perspective view showing a serial printer according to another embodiment of the present invention.

FIG. 19 is a schematic perspective view showing the configuration of a serial type printer 5 according to the other example of the present invention. It is apparent from the drawing that the printers using the method in which a treating liquid is first applied to a printing medium, then the Bk ink is ejected and reacted with the above treating liquid are not limited to the full line type printers described above. They are also applicable to the serial type ones. The same elements as in FIG. 15 are given the same reference numerals and the description thereof are omitted here.

Recording paper 103 as a printing medium is inserted from paper feeding portion 105 and delivered via a printing portion 126 in the direction Y. In this example, low-priced plain paper widely used was used as the recording paper 103. In the printing portion 126, a carriage 107 is carrying print heads 101Bk, 101S, 101C, 101M and 101Y and is constructed in such a manner that it can move back and forth along a guide rail 109 by the driving force of a motor not shown in the drawing. The print head 101S can eject the treating liquid described in the above embodiment. The print heads 101Bk, 101C, 101M and 101Y can eject a black ink, a cyan ink, a magenta ink and a yellow ink, respectively, and they are driven to eject ink toward the recording paper 103 in this order.

Each head is supplied with the treating liquid or the ink from its corresponding ink tank, 108S, 108Bk, 108C, 108M or 109Y. On ejecting the ink, a driving signal is supplied to an electric heat inverter (heater) provided for each ejection orifice of each head, which causes the heat energy to act on the ink or the treating liquid to generate bubbles. The ejection of the ink or the treating liquid is carried out taking advantage of the pressure due to the occurrence of the bubbles. Each head is provided with 64 ejection openings with a density of 360 dpi, which are arranged in the almost same direction as the direction Y of conveying the recording paper 103, in other words, in the direction almost perpendicular to the scanning direction of each head. And with these ejection orifices, any ejection amounts referred to in the above examples can be materialized.

In the configuration described above, the distance between the two adjacent heads is set for 1 inch (about 2.54 cm), namely, the distance of the head 101S from the head 101Bs 1 inch (about 2.54 cm), printing density in the scanning direction is set for 720 dpi, and the ejection frequency of each head is set for 7.2 kHz. Under such conditions, the time after the treating liquid is ejected from the head 101S till the Bk ink is ejected from the head 101Bk is 0.05 second.

As described above, according to the present invention, a high ink fixing ability can be materialized in ink-jet printing, while keeping all of OD, sharpness in the edge portions of printed images and strike-through at a highly satisfactory level.

What is claimed is:

1. An ink-jet printing method comprising the steps of:

imparting a treating liquid which contains a component that reacts chemically with a pigment in an ink and has a given penetrability onto a surface of a printing medium, and impacting an ink droplet containing the pigment onto a portion of the surface of the printing medium where the treating liquid has been imparted, wherein a penetrating depth of the pigment applied to the treating liquid on the surface of the printing medium is deeper than a penetrating depth of the pigment alone applied to the printing medium on which no treating liquid is imparted, but is shallower than a penetrating depth of the treating liquid.

2. The ink-jet printing method according to claim 1, wherein the depth of penetration of said pigment imparted to said treating liquid is regulated within a range of 15 μm to 30 μm.

3. An ink-jet printing method comprising the steps of:

forming an ink-receiving part on a surface of a printing medium, and conducting printing by depositing an ink so as to contact the ink-receiving part, wherein the ink-receiving part is formed by depositing onto a surface of the printing medium a treating liquid comprising a penetrating agent and an insolubilizer of a coloring material in the ink, the ink comprises a predetermined amount of a pigment as a coloring material, an average liquid thickness per pixel of the treating liquid forming the ink-receiving part at the impact on the printing medium is not more than 10 μm, the ratio of a volume of the treating liquid to a volume of the ink per pixel is not less than ⅛, and an average liquid thickness of the ink per pixel at the impact on the printing medium is from 8 μm to 20 μm.

4. The ink-jet printing method according to claim 3, wherein the ink comprises a coloring material in an amount of 3 to 10% by weight.

5. The ink-jet printing method according to claim 4, wherein a pigment in said coloring material is carbon black.

6. The ink-jet printing method according to claim 5, wherein said carbon black is self-dispersing pigment.

7. The ink-jet printing method according to claim 6, wherein a ratio of said carbon black to the entire coloring material is not less than 30% by weight.

8. The ink-jet printing method according to claim 4, wherein said coloring material comprises carbon black and a dye.

9. The ink-jet printing method according to claim 3, wherein said penetrating agent comprises a nonionic surface active agent.

10. The ink-jet printing method according to claim 9, wherein said penetrating agent comprises a nonionic surface active agent at a concentration higher than the critical micelle concentration in water.

11. The ink-jet printing method according To claim 3, wherein said insolubilizer comprises a polymeric component having an opposite polarity to the pigment.

12. The ink-jet printing method according to claim 11, wherein said polymeric component is polyallylamine.

13. The ink-jet printing method according to claim 3, wherein said ink-receiving part is formed by droplets of the treating liquid imparted based on pattern-masked image data.

14. The ink-jet printing method according to claim 3, wherein an area factor of the treating liquid for forming said ink-receiving part is not less than 50%.

15. An ink-jet printing apparatus comprising:

a printing portion having a carriage disposed therein;

a plurality of print heads disposed on the carriage;

a plurality of fluid tanks corresponding to the plurality of print heads, wherein at least one of said plurality of fluid tanks contains a treating liquid and at least one of said plurality of fluid tanks contains an ink; and a control circuit to conduct printing by forming an ink-receiving part on a surface of a printing medium and then depositing the ink so as to contact the ink-receiving part, wherein the ink-receiving part is formed by depositing onto a surface of the printing medium a treating liquid comprising a penetrating agent and an insolubilizer of a coloring material in the ink, the ink comprises a predetermined amount of a pigment as a coloring material, an average liquid thickness per pixel of the treating liquid forming the ink-receiving part at the impact on the printing medium is not more than 10 μm, the ratio of a volume of the treating liquid to a volume of the ink per pixel is not less than ⅛, and an average liquid thickness of the ink per pixel at the impact on the printing medium is from 8 μm to 20 μm.

16. The ink-jet printing apparatus according to claim 15, wherein the ink comprises a coloring material in an amount of 3 to 5% by weight.

17. The ink-jet printing apparatus according to claim 16, wherein a pigment in said coloring material is carbon black.

18. The ink-jet printing apparatus according to claim 17, wherein said carbon black is self-dispersing pigment.

19. The ink-jet printing apparatus according to claim 17, wherein a ratio of said carbon black to the entire coloring material is not less than 30% by weight.

20. The ink-jet printing apparatus according to claim 16, wherein said coloring material comprises carbon black and a dye.

21. The ink-jet printing apparatus according to claim 15, wherein said penetrating agent comprises a nonionic surface active agent.

22. The ink-jet printing apparatus according to claim 21, wherein said penetrating agent comprises a nonionic surface active agent at a concentration higher than the critical micelle concentration in water.

23. The ink-jet printing apparatus according to claim 15, wherein said insolubilizer comprises a polymeric component having an opposite polarity to the pigment.

24. The ink-jet printing apparatus according to claim 23, wherein said polymeric component is polyallylamine.

25. The ink-jet printing apparatus according to claim 15, wherein said ink-receiving part is formed by droplets of the treating liquid imparted based on pattern-masked image data.

26. The ink-jet printing apparatus according to claim 15, wherein an area factor of the treating liquid for forming said ink-receiving part is not less than 50%.

27. The ink-jet printing apparatus according to claim 15, wherein the ink and the treating liquid are each deposited on the printing medium by ejection from respective ones of the plurality of print heads, and wherein the print heads cause the ink and the treating liquid respectively to generate bubbles by the use of heat energy for ejecting the ink and the treating liquid respectively by the pressure of said bubbles.

28. An ink-jet printing method comprising the step of applying an ink comprising a pigment in a dispersed state to at least a part of a predetermined region of a printing medium, to which a liquid has been imparted, to form a pigmented portion on the printing medium, wherein the liquid contains a component having a reactivity to the pigment contained in the ink and shows a higher level of penetrability into the printing medium than the ink, and wherein a penetrating depth of the pigment applied to the printing medium at the pigmented portion is deeper than a penetrating depth of the pigment at the pigmented portion obtained in a case that only the ink is applied to the printing medium, but is shallower than at a peak of penetration of the treating liquid.

29. The ink-jet printing method according to claim 28, wherein said pigment is a self-dispersing pigment.

30. The ink-jet printing method according to claim 28 or 29, wherein said ink further contains a dye as coloring material.

31. The ink-jet printing method according to claim 28 or 29, wherein a content of the pigment in the coloring material in said ink is within a range of 25% to 100% by weight of the coloring material.

32. The ink-jet printing method according to claim 31, wherein the content of the pigment in the coloring material in said ink is within a range of 30% to 70% by weight of the coloring material.

33. The ink-jet printing method according to claim 28 or 29, wherein said treating liquid contains not less than 0.7% by weight of acetylenol, based on the weight of said treating liquid.

34. The ink-jet printing method according to claim 28 or 29, wherein said component having a reactivity is selected from the group consisting of polyallylamine and benzalkonium chloride.

35. A printed article having a pigmented portion formed by contacting an ink comprising a pigment in a dispersed state with a predetermined portion of the article to which a liquid has been imparted, wherein the liquid contains a component having a reactivity to the pigment contained in the ink and shows a higher level of penetrability into the article than the ink does and wherein a penetrating depth of the pigment applied to the article at the pigmented portion is deeper than a penetrating depth of the pigment at the pigmented portion obtained when only the ink is applied to the article, but is shallower than at a peak of penetration of the treating liquid.

36. The printed article according to claim 35, wherein the depth of penetration of said pigment in said pigmented portion into said article is 20 μm from the surface of said article.

* * * * *

UNITED STATES PATENT AND TRADEMARK OFFICE
CERTIFICATE OF CORRECTION

PATENT NO. : 6,454,402 B1
DATED : September 24, 2002
INVENTOR(S) : Noribumi Koitabashi et al.

It is certified that error appears in the above-identified patent and that said Letters Patent is hereby corrected as shown below:

Title page, Item [54] and Column 1, line 1,
"AN" should read -- AND --.

Title page,
Item [57] ABSTRACT,
Line 1, "comprising" should read -- including --.

Column 1,
Line 51, "Ink" should read -- ink --; and
Line 58, "printing-system" should read -- printing system --

Column 2,
Line 51, "the." should read --the --.

Column 3,
Line 18, "20 $\mu$m" should read -- 20 $\mu$m. --;
Line 39, "imparted," should read -- imparted --; and
Line 40, "medium" should read -- medium, --.

Column 6,
Line 18, "whereby." should read -- whereby -- .

Column 8,
Line 67, "moreover," should read -- Moreover, --.

Column 10,
Line 61, "papers)," should read -- papers); --.

Column 11,
Line 43, "value," should read -- value; --; and
Line 53, "the reason" should read -- The reason --.

Column 12,
Line 20, "In" should read -- in --

UNITED STATES PATENT AND TRADEMARK OFFICE
CERTIFICATE OF CORRECTION

PATENT NO. : 6,454,402 B1 
DATED : September 24, 2002
INVENTOR(S) : Noribumi Koitabashi et al.

It is certified that error appears in the above-identified patent and that said Letters Patent is hereby corrected as shown below:

Column 13,
Line 47, "ink." should read -- ink --; and
Line 51, "from" should read -- from that --.

Column 14,
Line 6, "liquid," should read -- liquid; --; and
Line 51, "penetrates" should read -- penetrate --.

Column 15,
Line 2, "the-pigment" should read -- the pigment -- and
Line 63, "Ink" should read -- ink --.

Column 16,
Line 33, "liquid-must" should read -- liquid must --.

Column 17,
Line 20, "Investigation" should read -- investigation --; and
Line 61, "Hs=1/4" should read -- Hs=¼ --.

Column 18,
Line 3, "amount" should read -- amount is -- and "thickness" should read -- thickness is --.
Line 18, "same, further" should read -- same; further, --.
Line 36, "Adopts" should read -- adopts --.
Line 41, "In" should read -- in --.
Line 49, "on it" should read -- on it. --; and
Line 62, "drawing" should read -- drawing, --.

Column 19,
Line 46, "view" should be deleted.

Column 20,
Line 17, "content," should read -- content; --; and
Line 55, "Increase" should read -- increase --.

Column 22,
Line 14, "In" should read -- in --.

UNITED STATES PATENT AND TRADEMARK OFFICE

CERTIFICATE OF CORRECTION

PATENT NO. : 6,454,402 B1 
DATED : September 24, 2002
INVENTOR(S) : Noribumi Koitabashi et al.

It is certified that error appears in the above-identified patent and that said Letters Patent is hereby corrected as shown below:

Column 23,
Line 32, "4 $KH_2$," should read -- 4 $KH_2$; --;
Line 35, "40 mm," should read -- 40 mm; --;
Line 42, "particle." should read -- particle --; and
Line 61, "same," should read -- same; --.

Column 24,
Line 54, "obtained," should read -- obtained; --.

Column 25,
Line 7, "example-was" should read -- example was --; and
Line 56, "101Bs" should read 101Bk is --.

Column 26,
Line 59, "To" should read -- to --.

Signed and Sealed this

Twelfth Day of August, 2003

JAMES E. ROGAN
*Director of the United States Patent and Trademark Office*